(12) United States Patent
Kope et al.

(10) Patent No.: US 7,866,899 B2
(45) Date of Patent: Jan. 11, 2011

(54) ENHANCED CAMERA TRANSPORT SYSTEM AND METHOD

(75) Inventors: Tyler R. M. Kope, Seattle, WA (US); Ronald D. Henry, Seattle, WA (US)

(73) Assignee: Black Rapid, Inc., Seattle, WA (US)

( * ) Notice: Subject to any disclaimer, the term of this patent is extended or adjusted under 35 U.S.C. 154(b) by 331 days.

(21) Appl. No.: 12/105,222

(22) Filed: Apr. 17, 2008

(65) Prior Publication Data
US 2008/0292303 A1 Nov. 27, 2008

Related U.S. Application Data

(60) Provisional application No. 60/912,382, filed on Apr. 17, 2007.

(51) Int. Cl.
G03B 17/00 (2006.01)
B65D 85/38 (2006.01)

(52) U.S. Cl. .................... 396/423; 206/316.2
(58) Field of Classification Search ............... 396/423; 206/316.2
See application file for complete search history.

(56) References Cited

U.S. PATENT DOCUMENTS

| | | | |
|---|---|---|---|
| 3,905,526 A | 9/1975 | Tomatsuri | |
| 4,136,726 A * | 1/1979 | Lee | 206/316.2 |
| 4,247,028 A | 1/1981 | Maitani et al. | |
| 4,328,917 A | 5/1982 | Reeberg | |
| 4,649,973 A | 3/1987 | Uchin | |
| 5,014,892 A | 5/1991 | Copeland | |
| 5,172,838 A * | 12/1992 | Rowell et al. | 224/680 |
| 5,375,749 A | 12/1994 | Oliva | |
| 6,662,984 B2 * | 12/2003 | Mor | 224/576 |

FOREIGN PATENT DOCUMENTS

| | | |
|---|---|---|
| GB | 680194 | 10/1952 |
| JP | 20000308512 | 11/2000 |
| JP | 2002196412 | 7/2002 |

OTHER PUBLICATIONS

US 1885 Carbine gun sling sold more than one year prior to filing date of application, illustrations and product information from www.rollanet.org, Apr. 16, 2007.

* cited by examiner

*Primary Examiner*—Rodney E Fuller
(74) *Attorney, Agent, or Firm*—Davis Wright Tremaine LLP; George C. Rondeau, Jr.

(57) ABSTRACT

An enhanced camera transport system and method includes a strap and coupler. The coupler is configured to engage with an attachment point on a camera otherwise reserved by engagement with a camera stand such as a tripod, monopod, or the like. Following general camera construction, the attachment point is found on the bottom of the camera. In some implementations, the coupler is slideably attached to the strap to assist with repositioning of the camera from a transport position to a picture taking position. Other implementations include an enclosure for storage of the camera while not being used.

12 Claims, 38 Drawing Sheets

ENHANCED CAMERA TRANSPORT SYSTEM AND METHOD

CROSS REFERENCE TO RELATED APPLICATION

This application claims priority benefit of provisional application Ser. No. 60/912,382 filed Apr. 17, 2007, the content of which is incorporated in its entirety.

BACKGROUND OF THE INVENTION

1. Field of the Invention

The present invention is generally related to camera equipment.

2. Description of the Related Art

Conventional camera storage and carrying systems help to store and transport cameras when not in use. Unfortunately, they include aspects that can hinder retrieval of a camera being stored or transported so that photographic opportunities can be missed.

BRIEF DESCRIPTION OF THE SEVERAL VIEWS OF THE DRAWING(S)

FIG. 13 is a cross sectional view of the implementation depicted in

FIG. 10.

Figure 10:
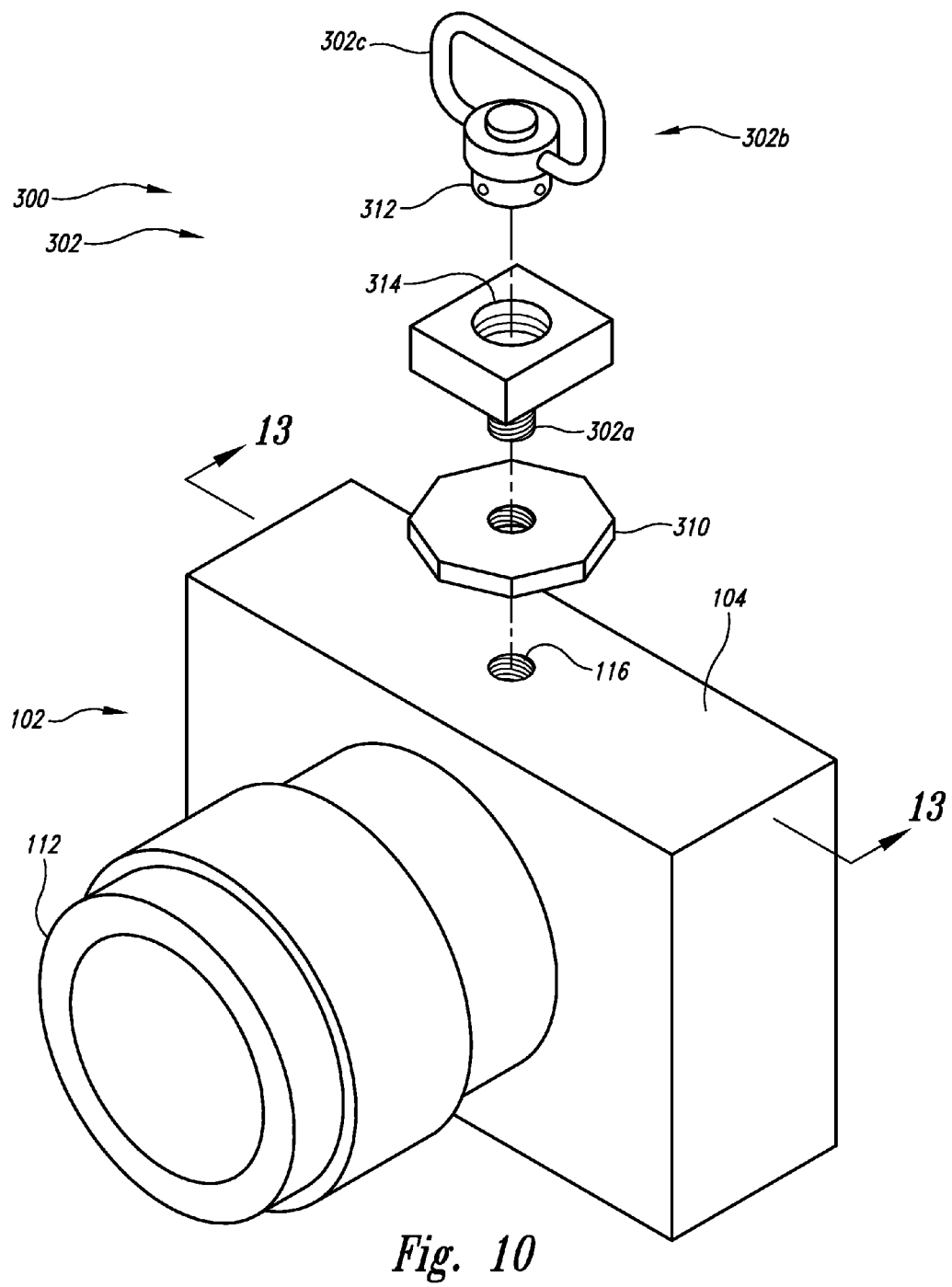
FIG. 10 is a perspective view of an exploded assembly of an alternate implementation of a coupler included in the system.
Figure 14:
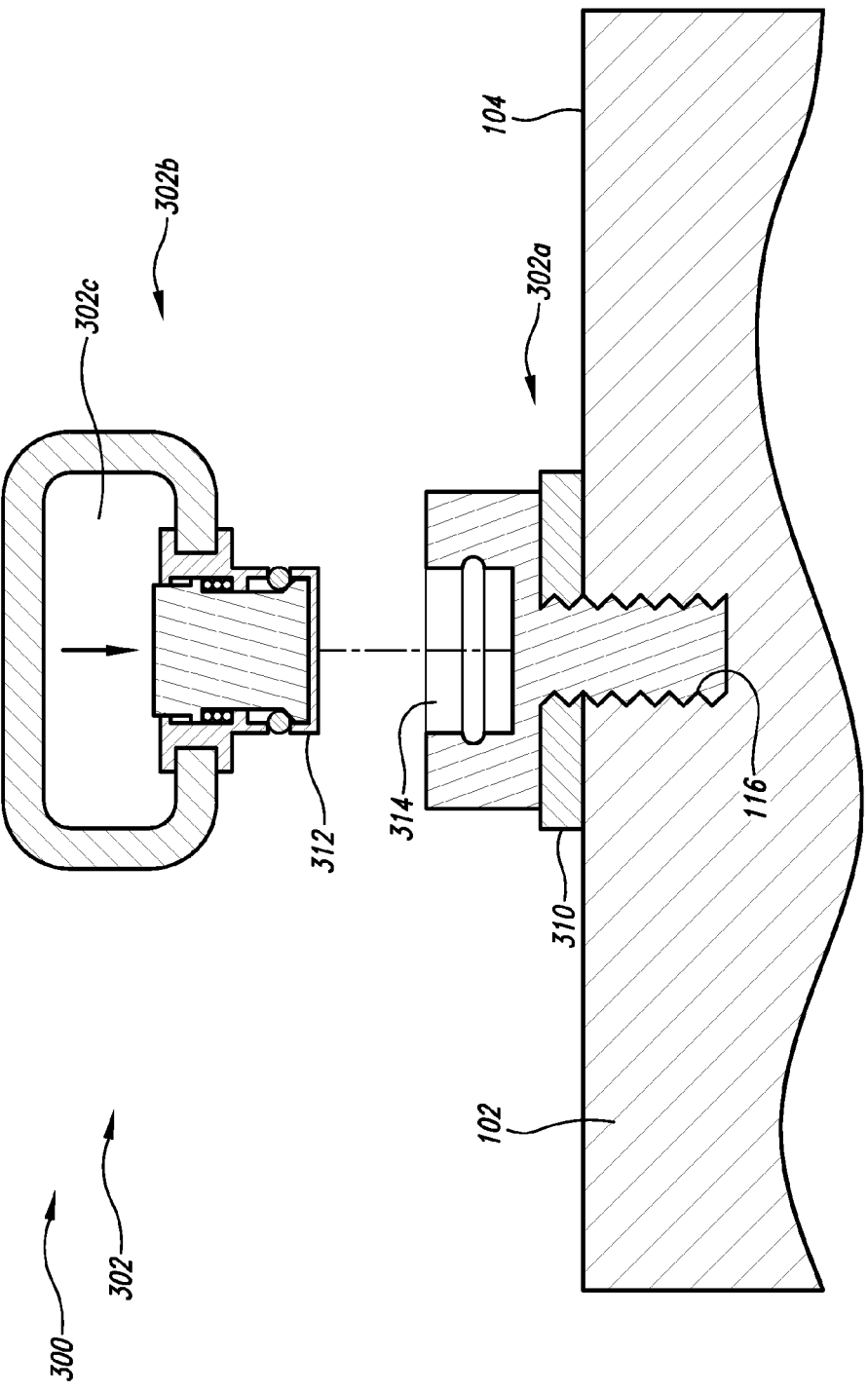

FIG. 14 is a cross sectional view of the implementation depicted in FIG. 10, and further showing engagement of the release mechanism of the connector.

Figure 15:
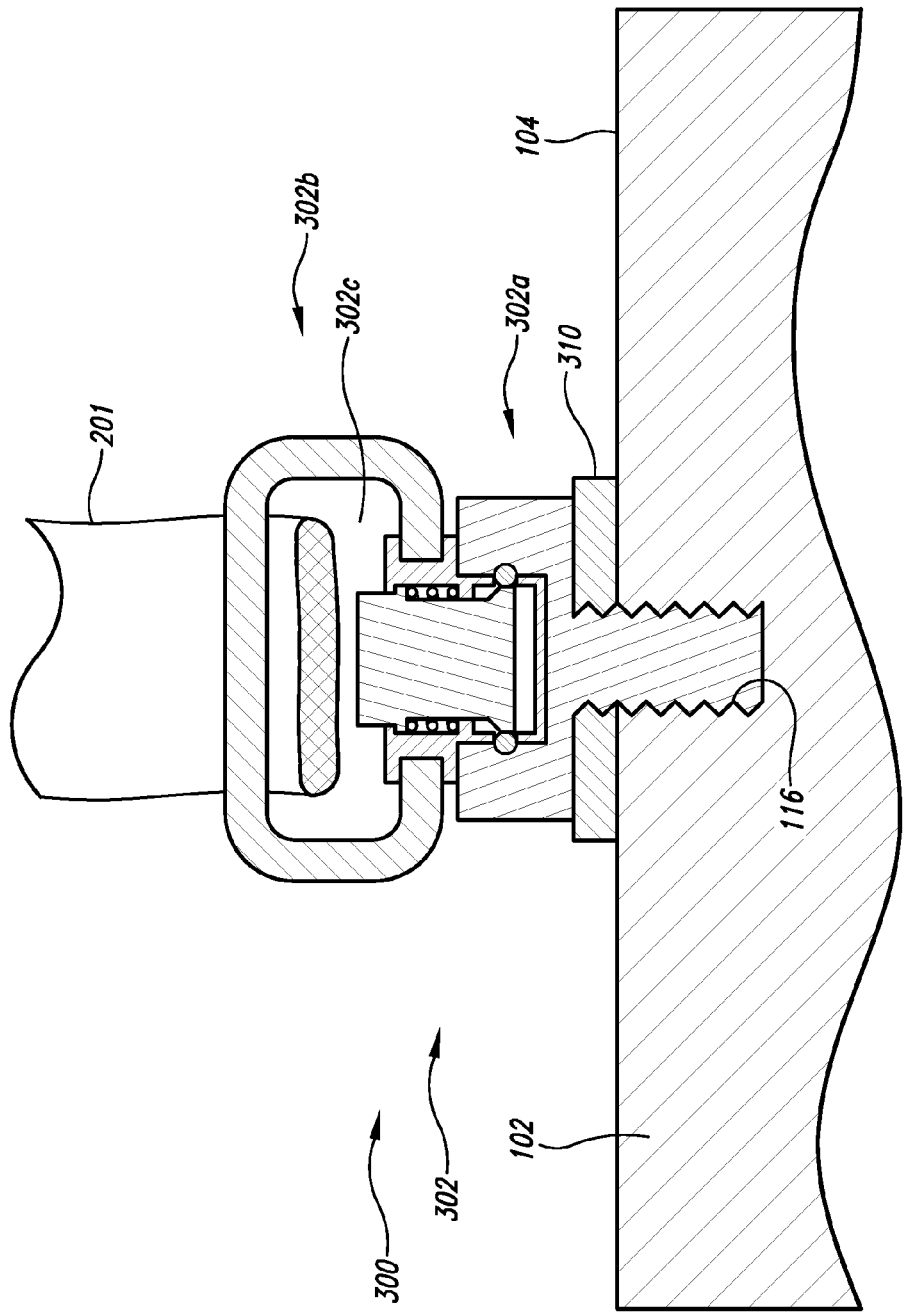

FIG. 15 is a cross sectional view of the implementation depicted in

FIG. 11.

Figure 16:
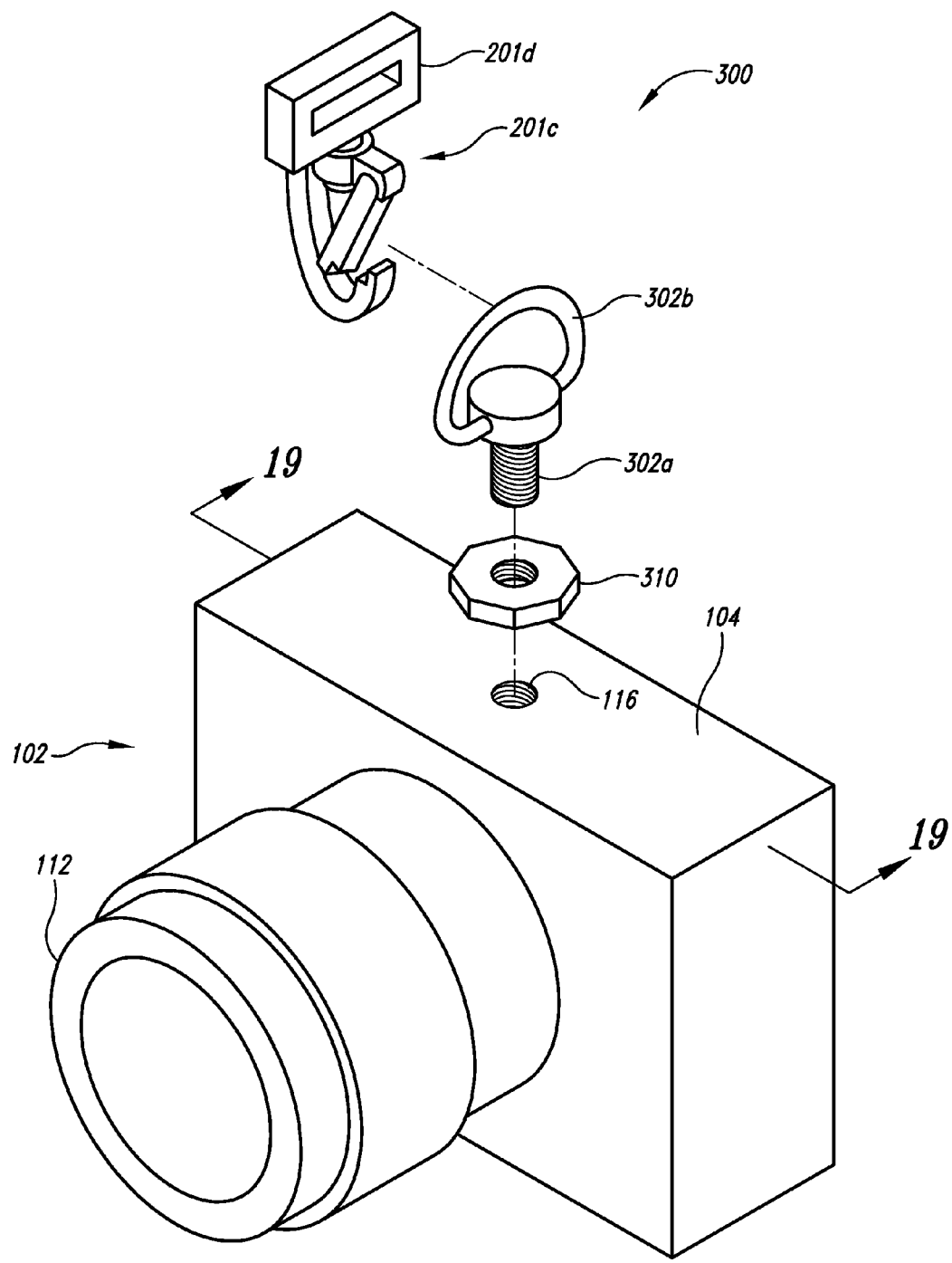

FIG. 16 is a perspective view of an exploded assembly of an alternate implementation of the coupler.

Figure 17:
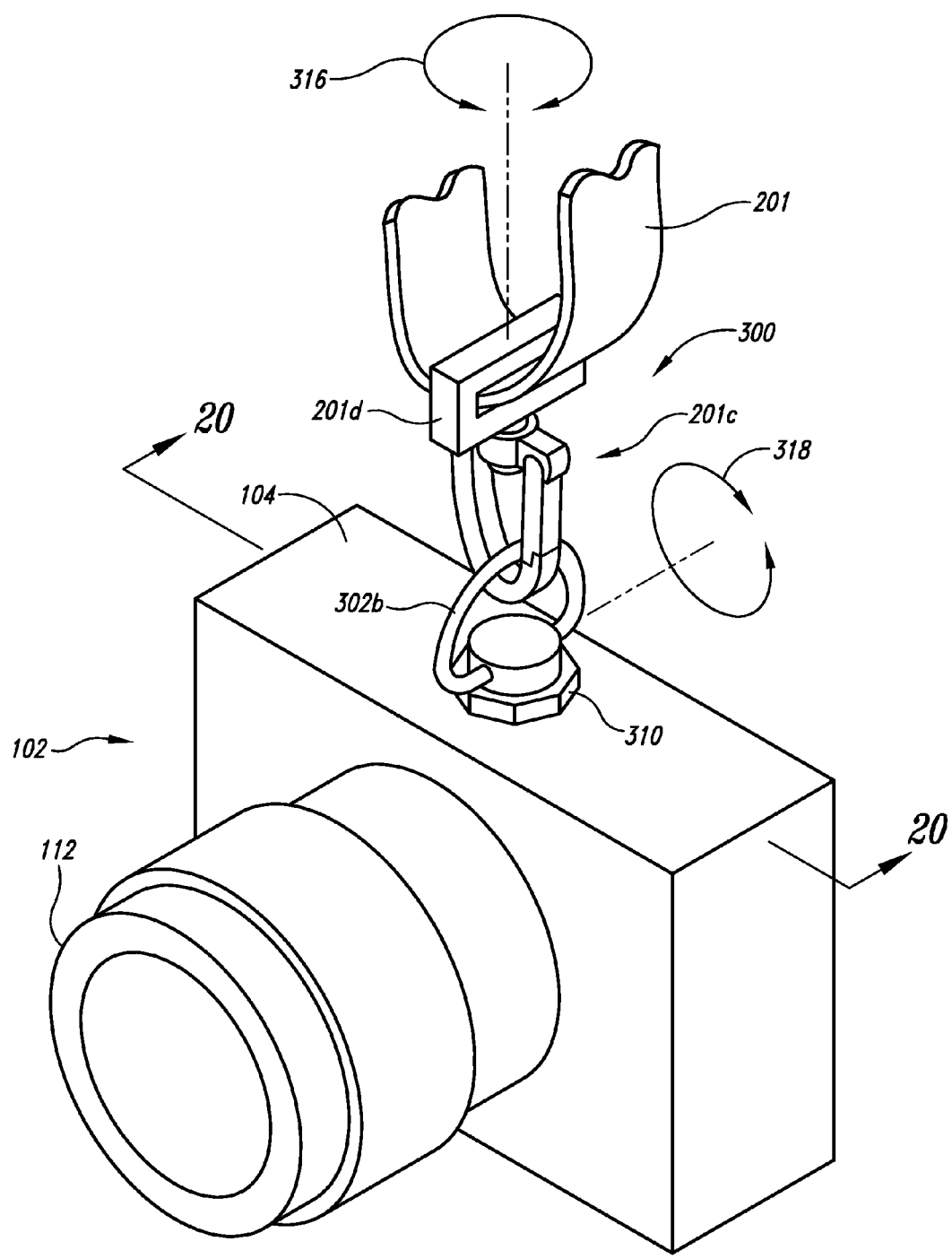

FIG. 17 is a perspective view of the implementation depicted in FIG. 16 secured to a camera and further showing a strap routed through the coupler.

Figure 18:
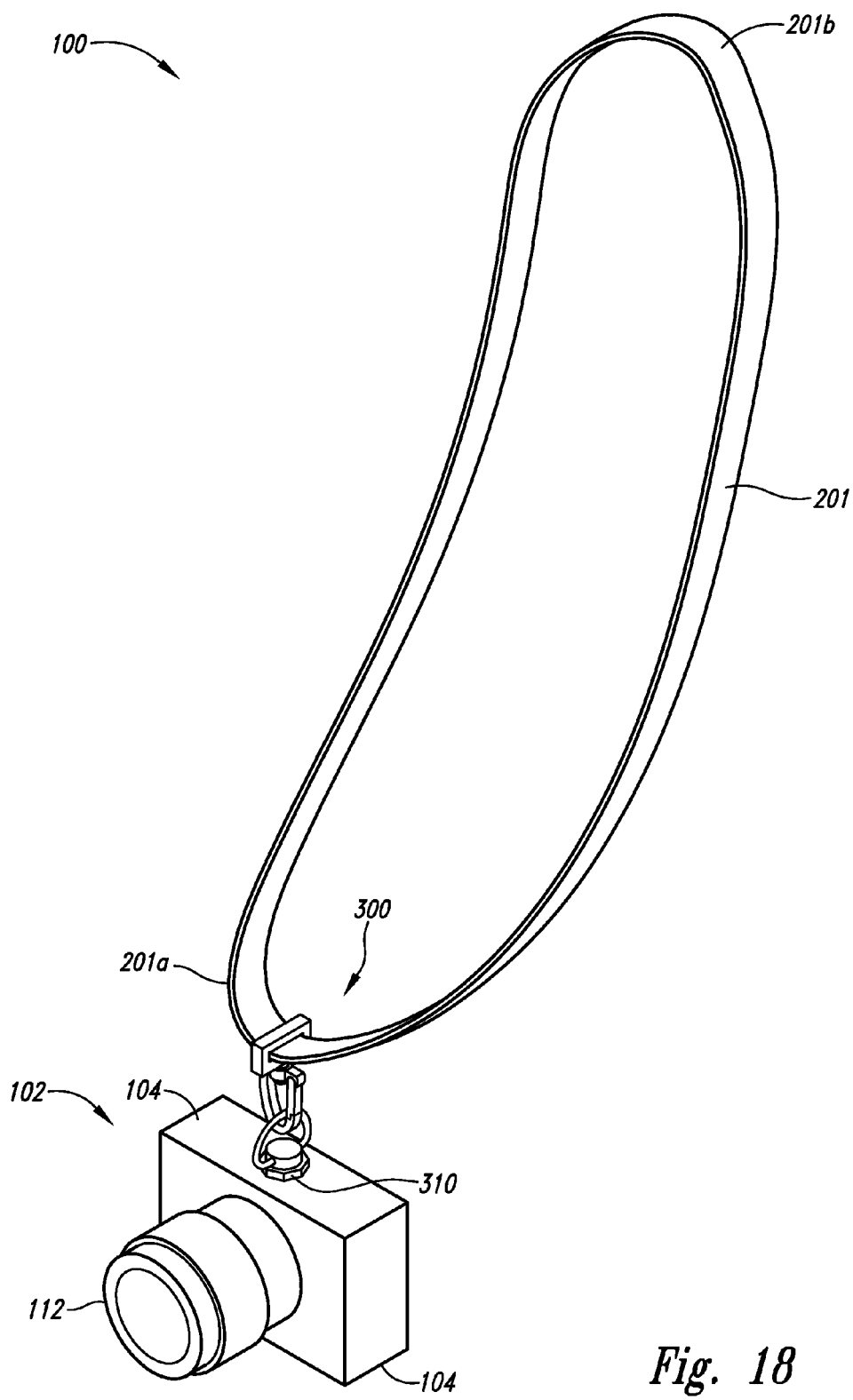

FIG. 18 is a perspective view of the implementation depicted in FIG. 16, showing the system in whole.

Figure 19:
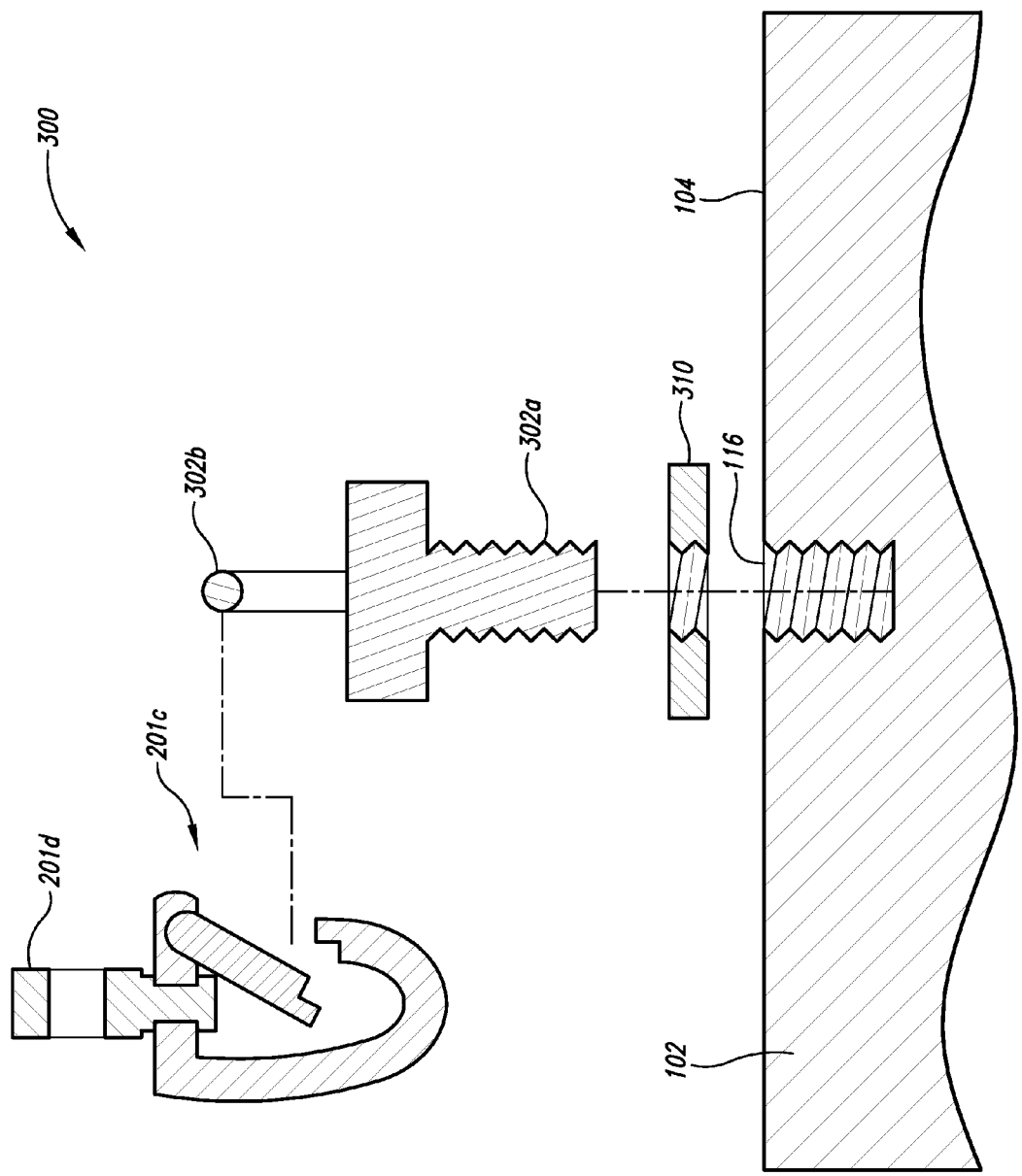

FIG. 19 is a cross sectional view of the implementation depicted in FIG. 16.

Figure 20:
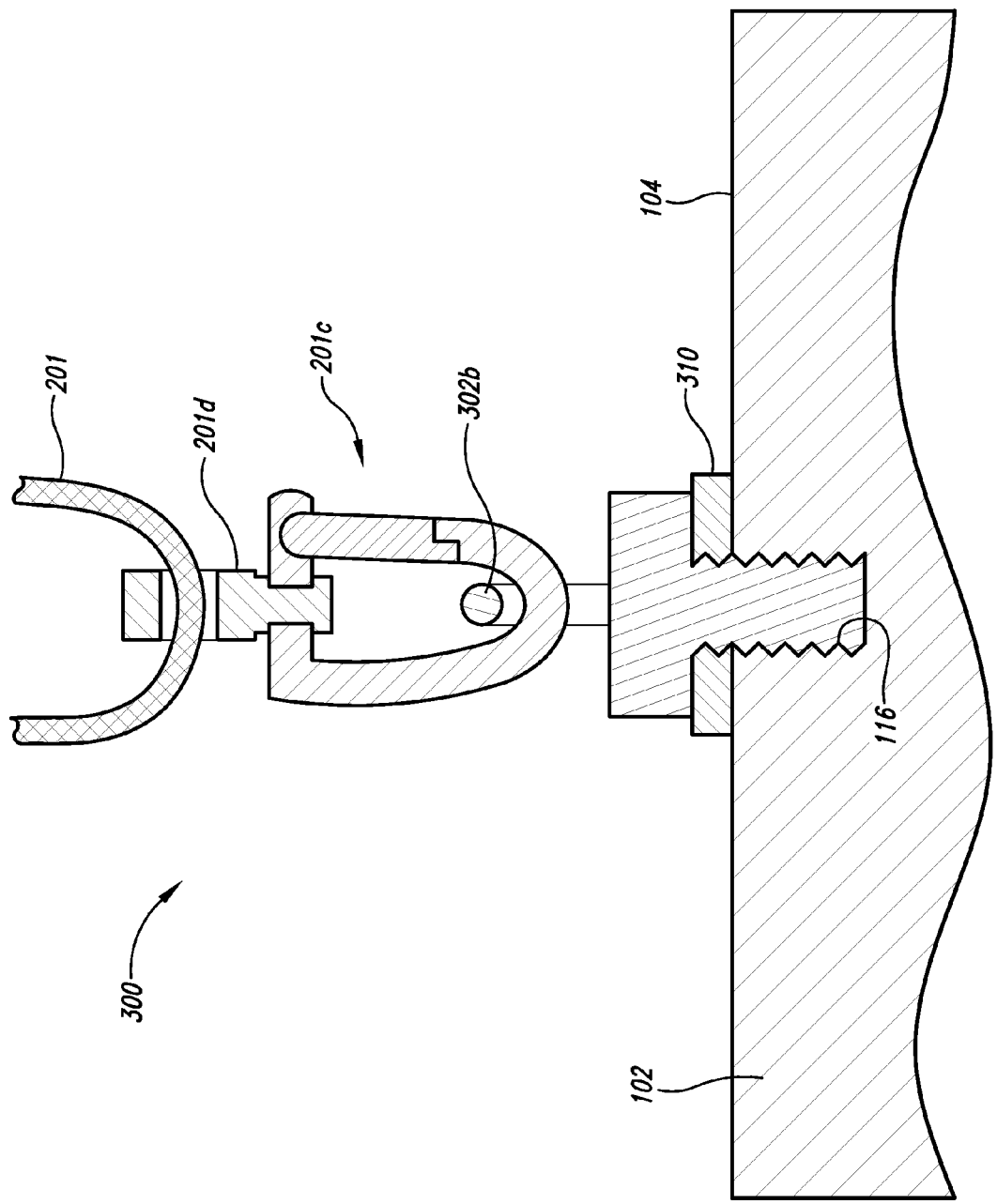

FIG. 20 is a cross sectional view of the implementation depicted in FIG. 17.

Figure 21:
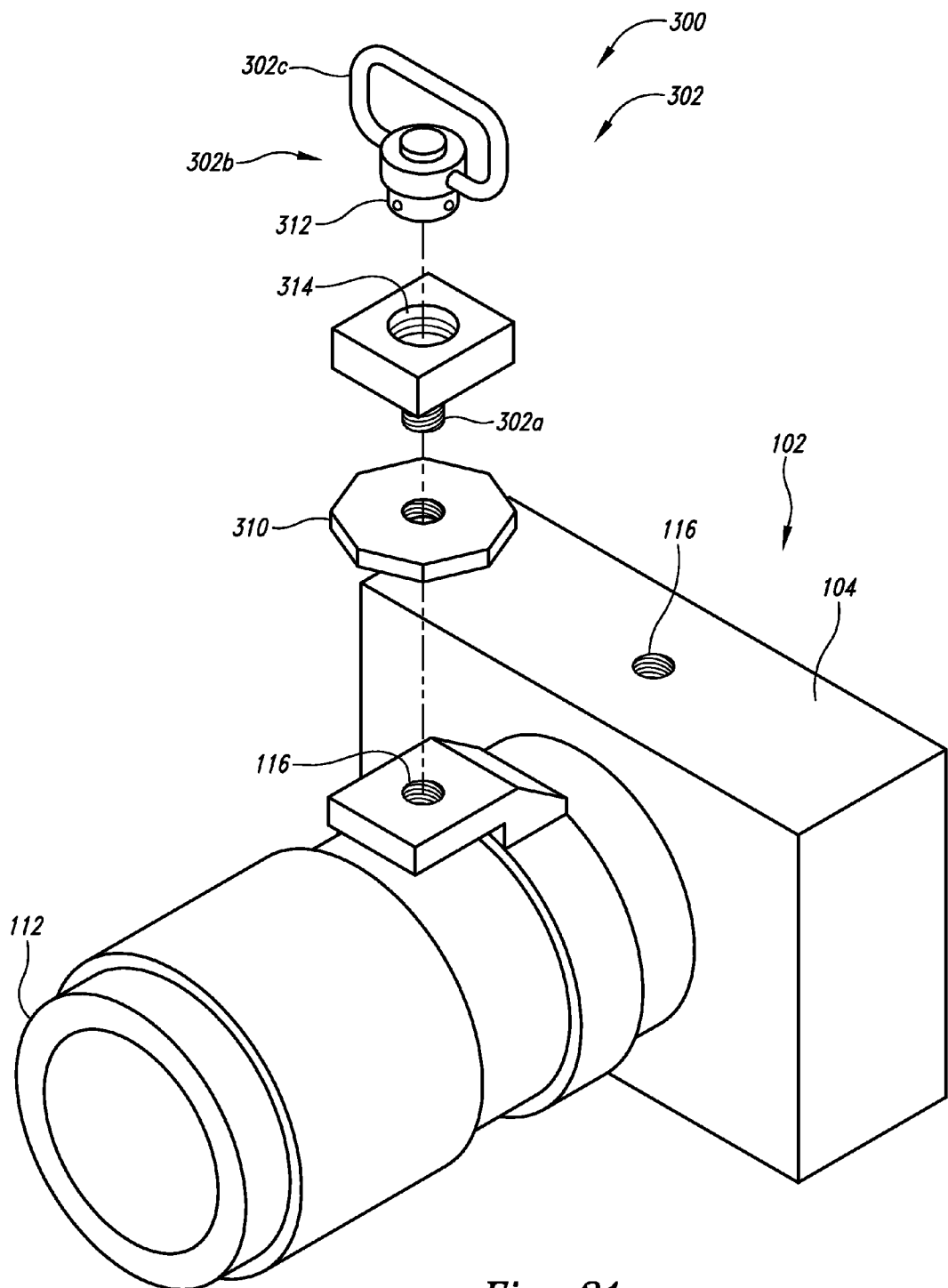

FIG. 21 is a perspective view of an exploded assembly of an alternate implementation of the coupler.

Figure 22:
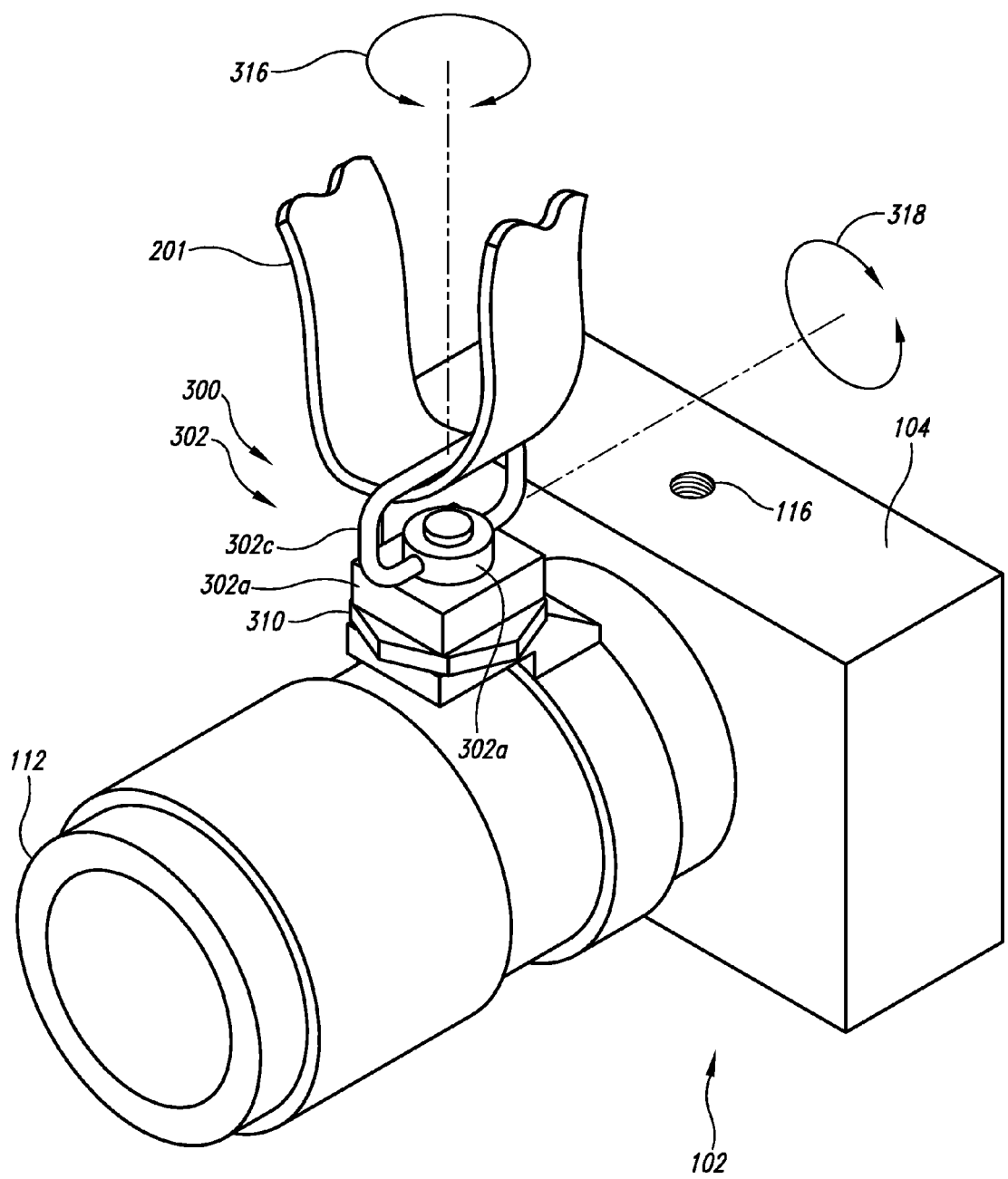

FIG. 22 is a perspective view of the implementation depicted in FIG. 21 secured to a lens, and further showing a strap routed through the coupler.

Figure 23:
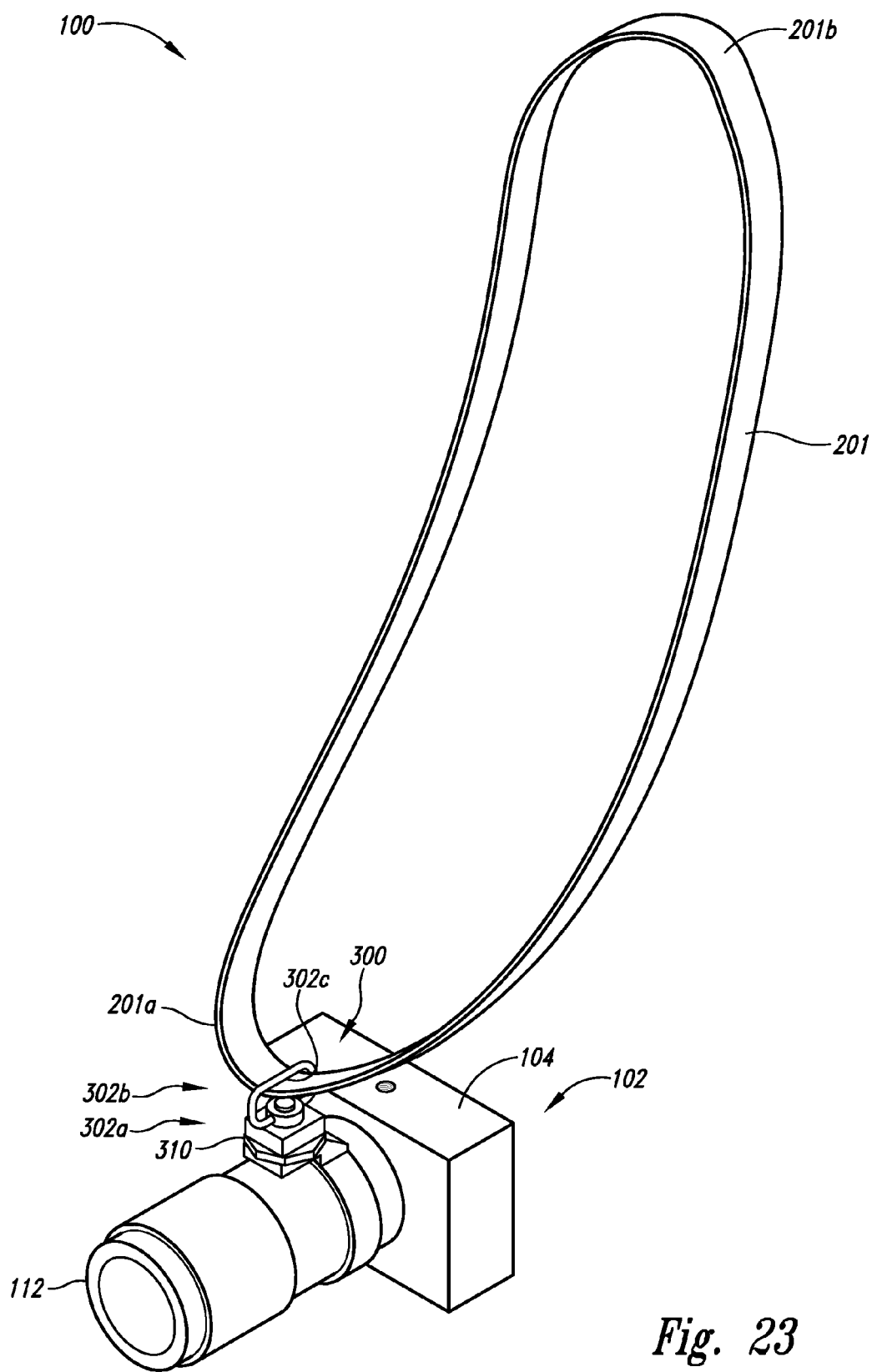

FIG. 23 is a perspective view of the implementation depicted in FIG. 22, showing the system in whole.

Figure 24:
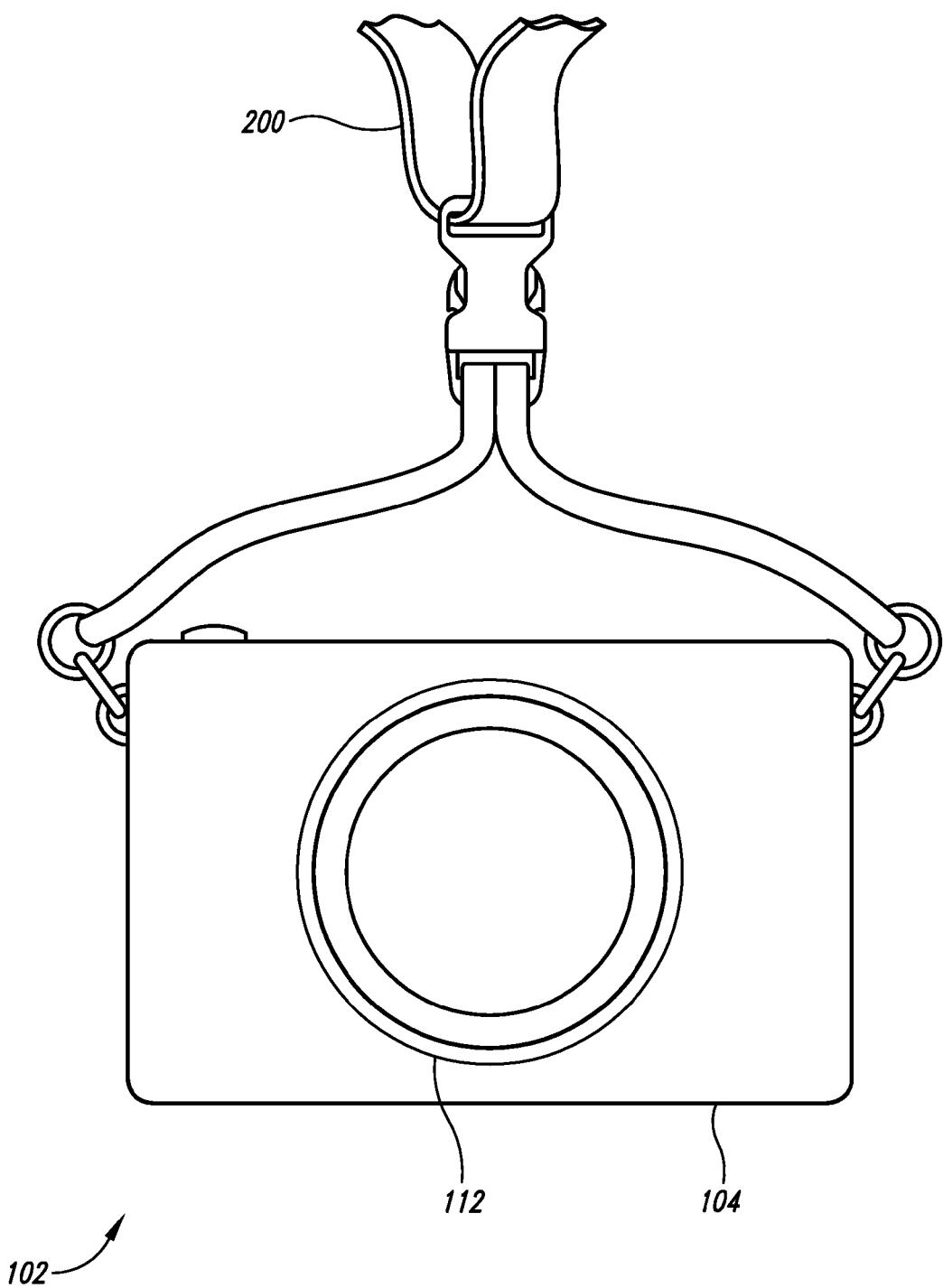

FIG. 24 is an elevational view of an alternate implementation of the coupler secured to a camera via the camera's conventional strap mount loops.

Figure 25:
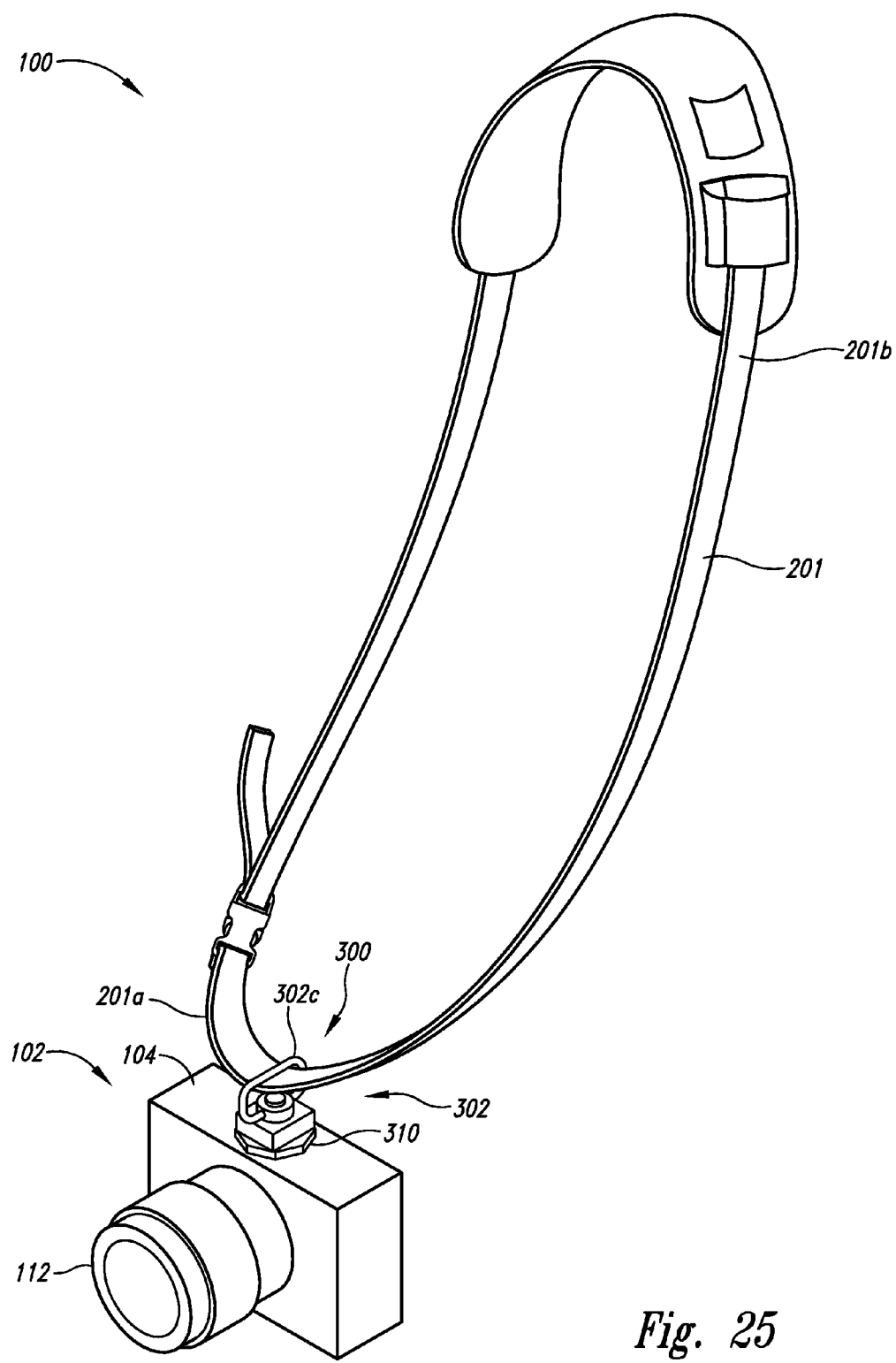

FIG. 25 is a perspective view of an alternate implementation of the system in whole.

Figure 26:
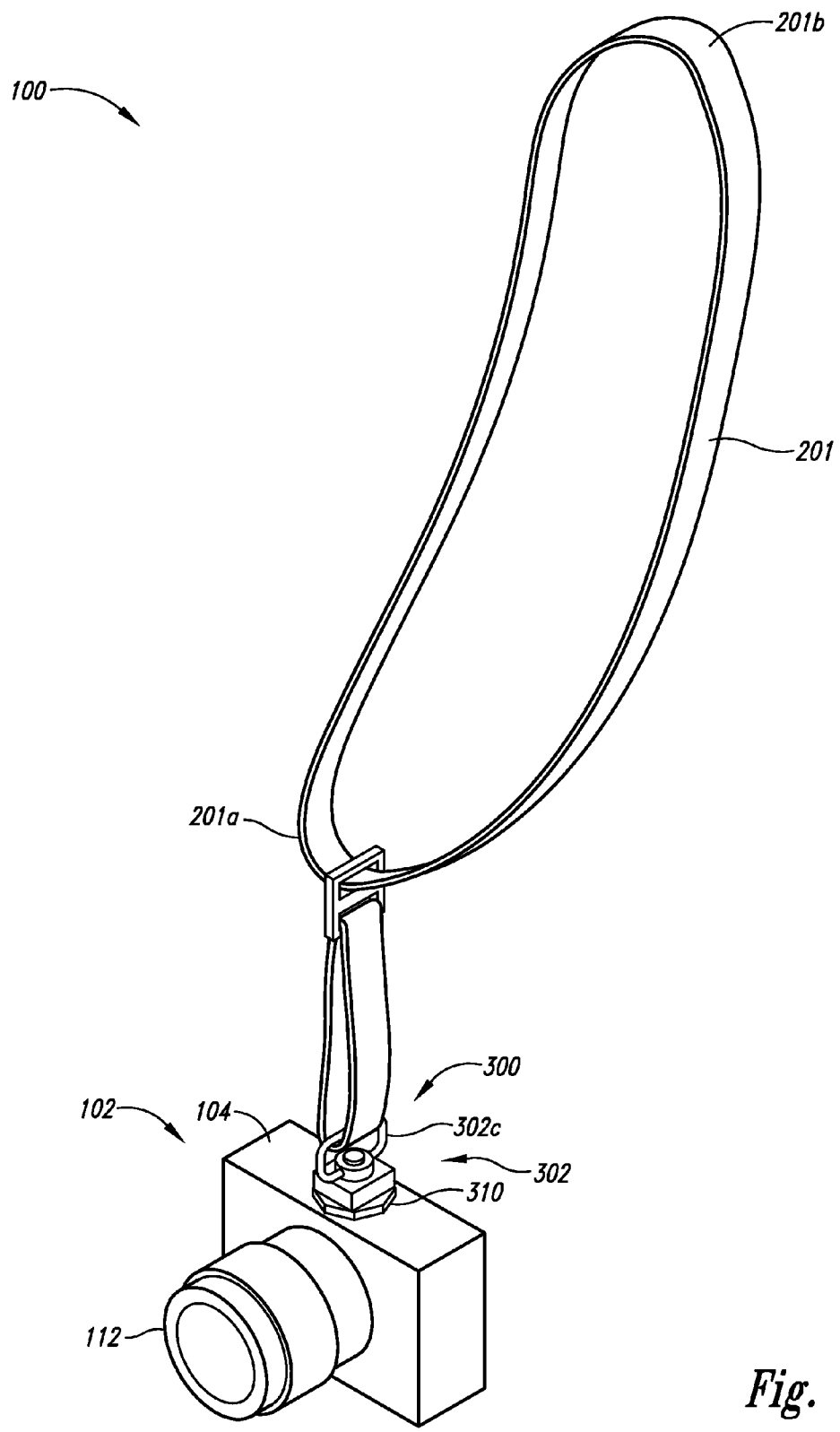

FIG. 26 is a perspective view of an alternate implementation of the system in whole, and further showing the use of a tether.

Figure 27:
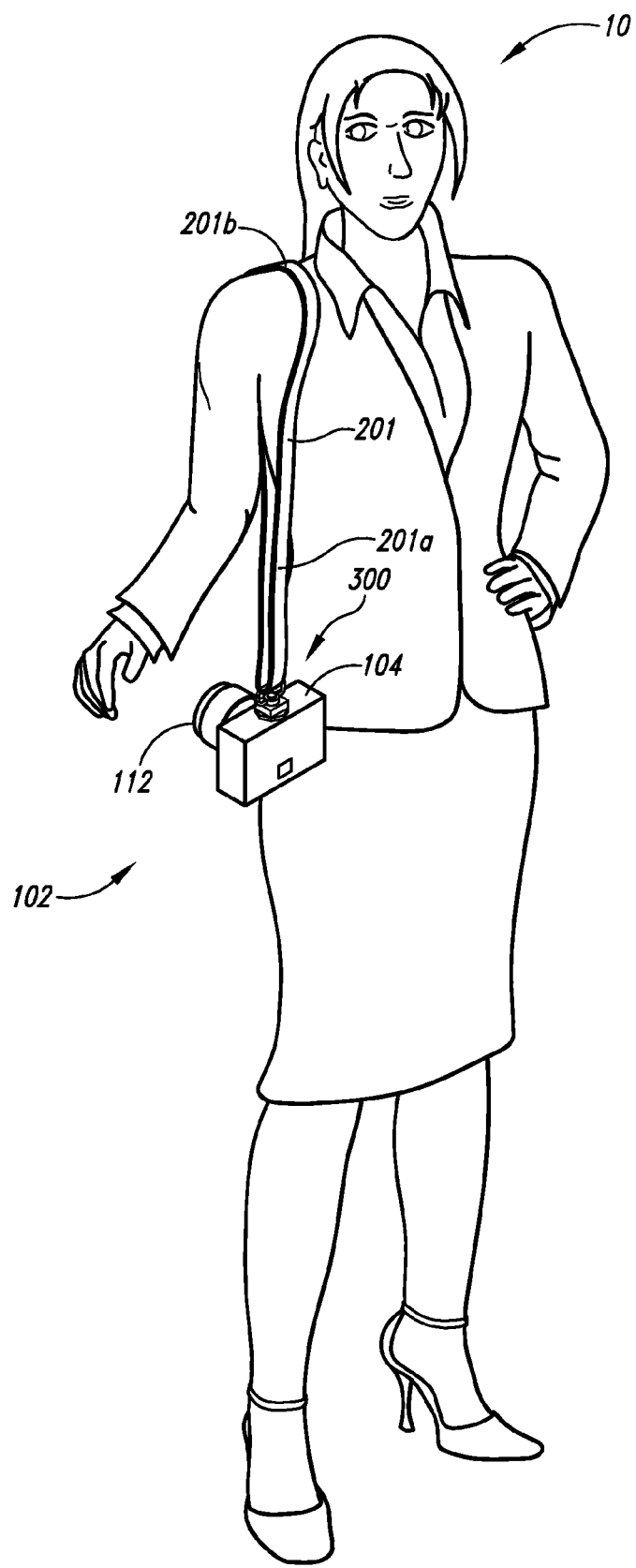

FIG. 27 is a view of an implementation of the camera transport system, shown with the camera in a resting position, and the strap being worn vertically from the shoulder of a user.

Figure 28:
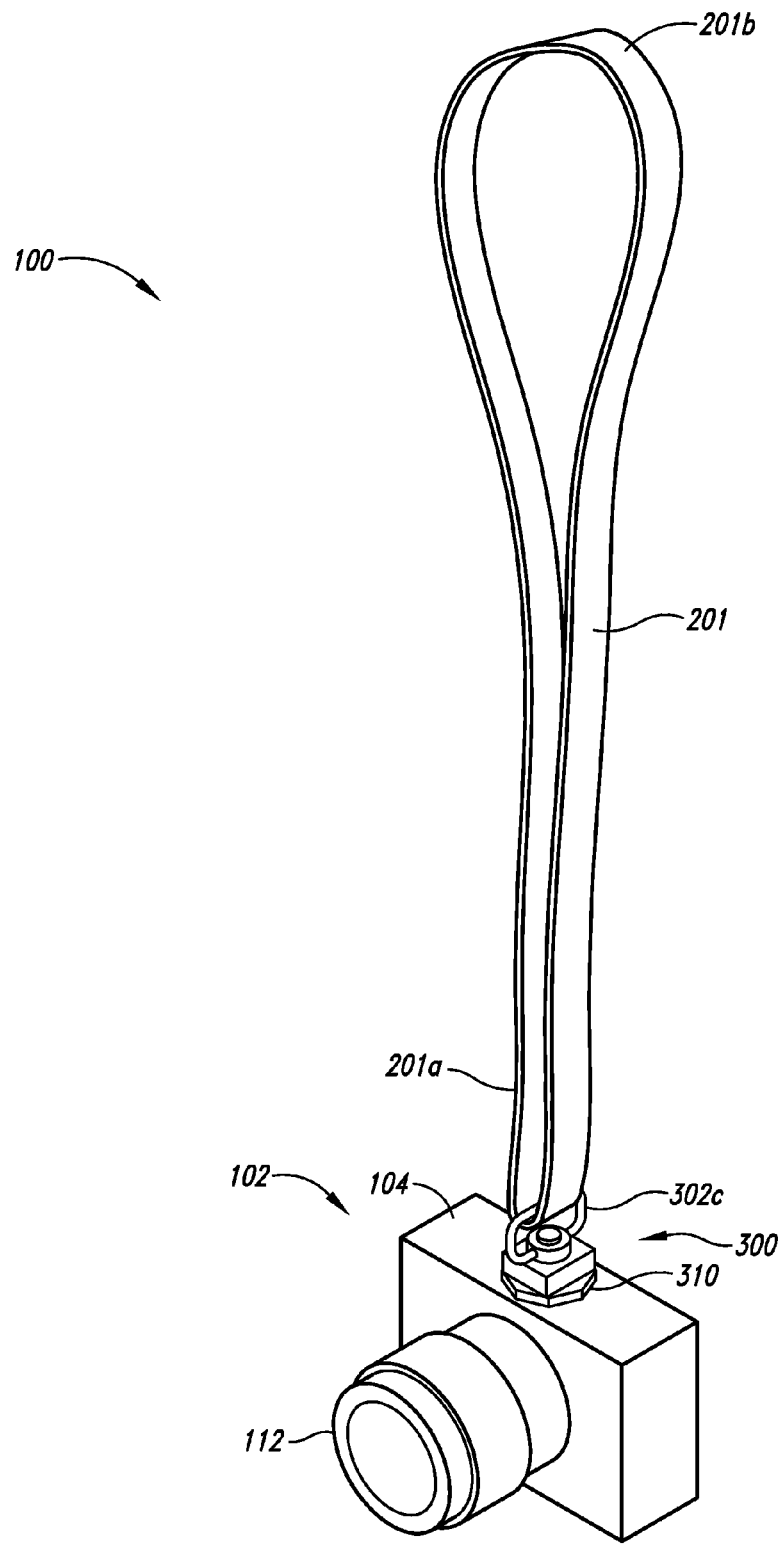

FIG. 28 is a perspective view of the implementation depicted in FIG. 27, shown in whole.

Figure 29:
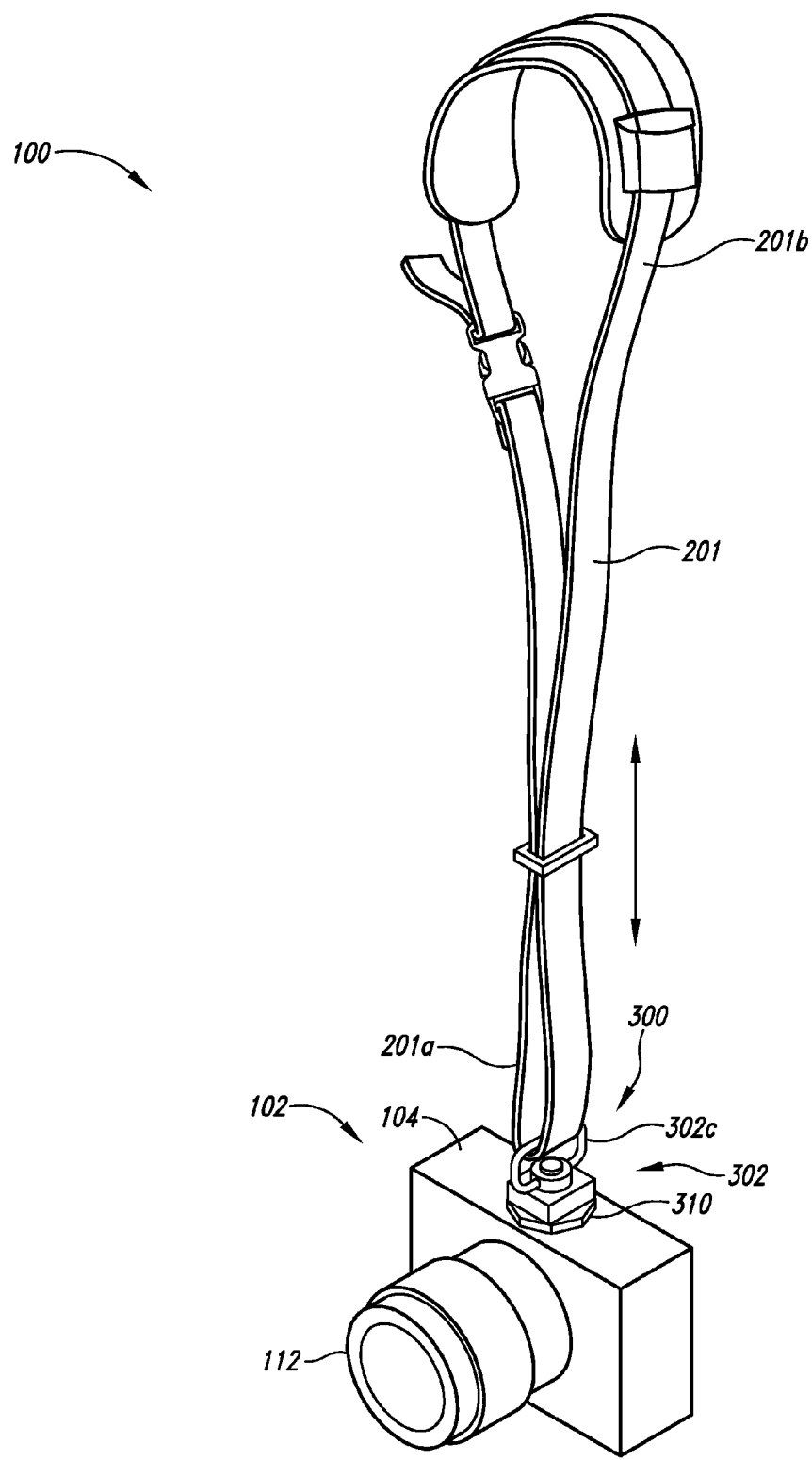

FIG. 29 is perspective view of an alternate implementation of the system depicted in FIG. 27.

Figure 30:
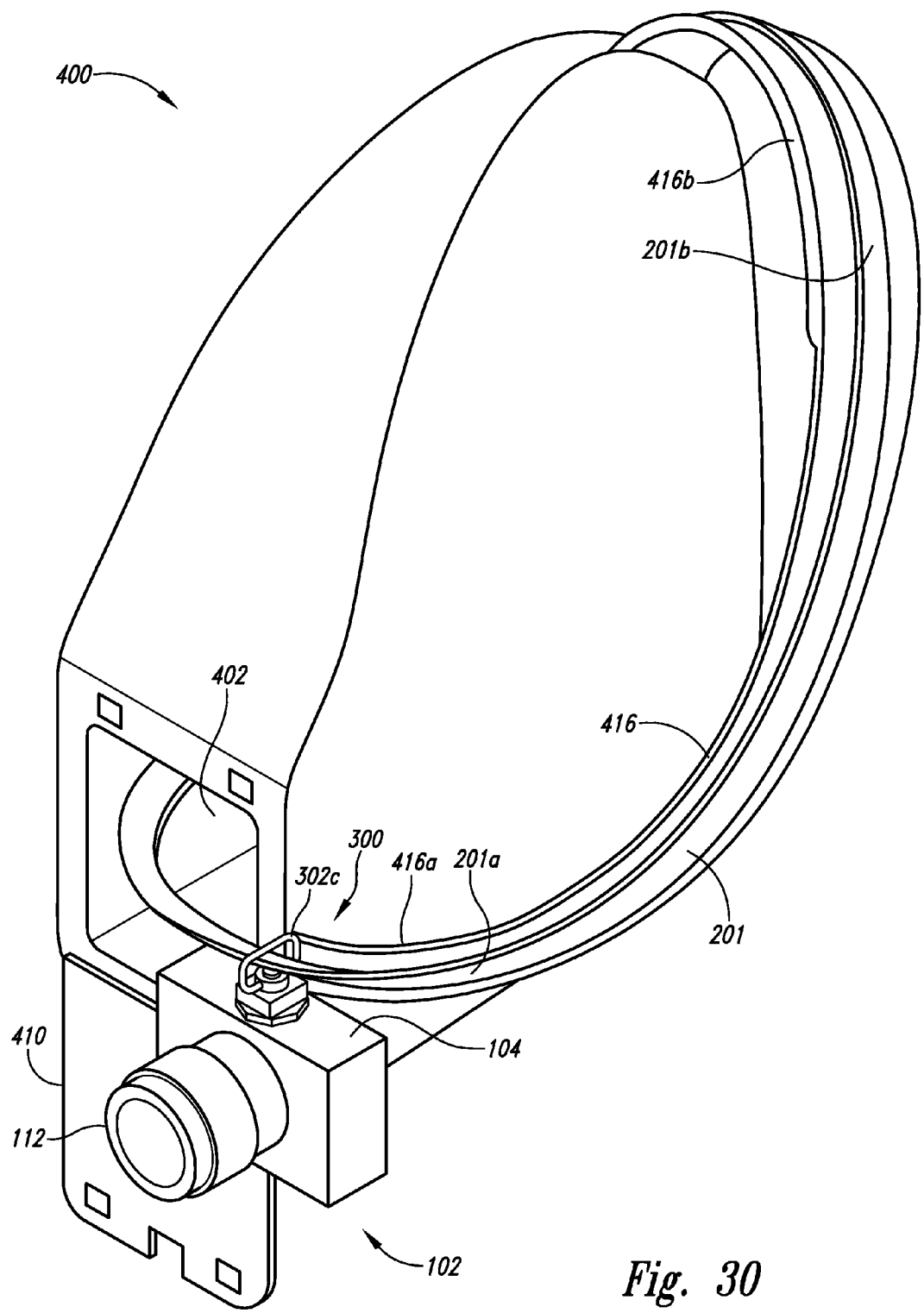

FIG. 30 is a perspective view of an implementation of the system, having an enclosure, and further showing the camera in a resting position.

Figure 31:
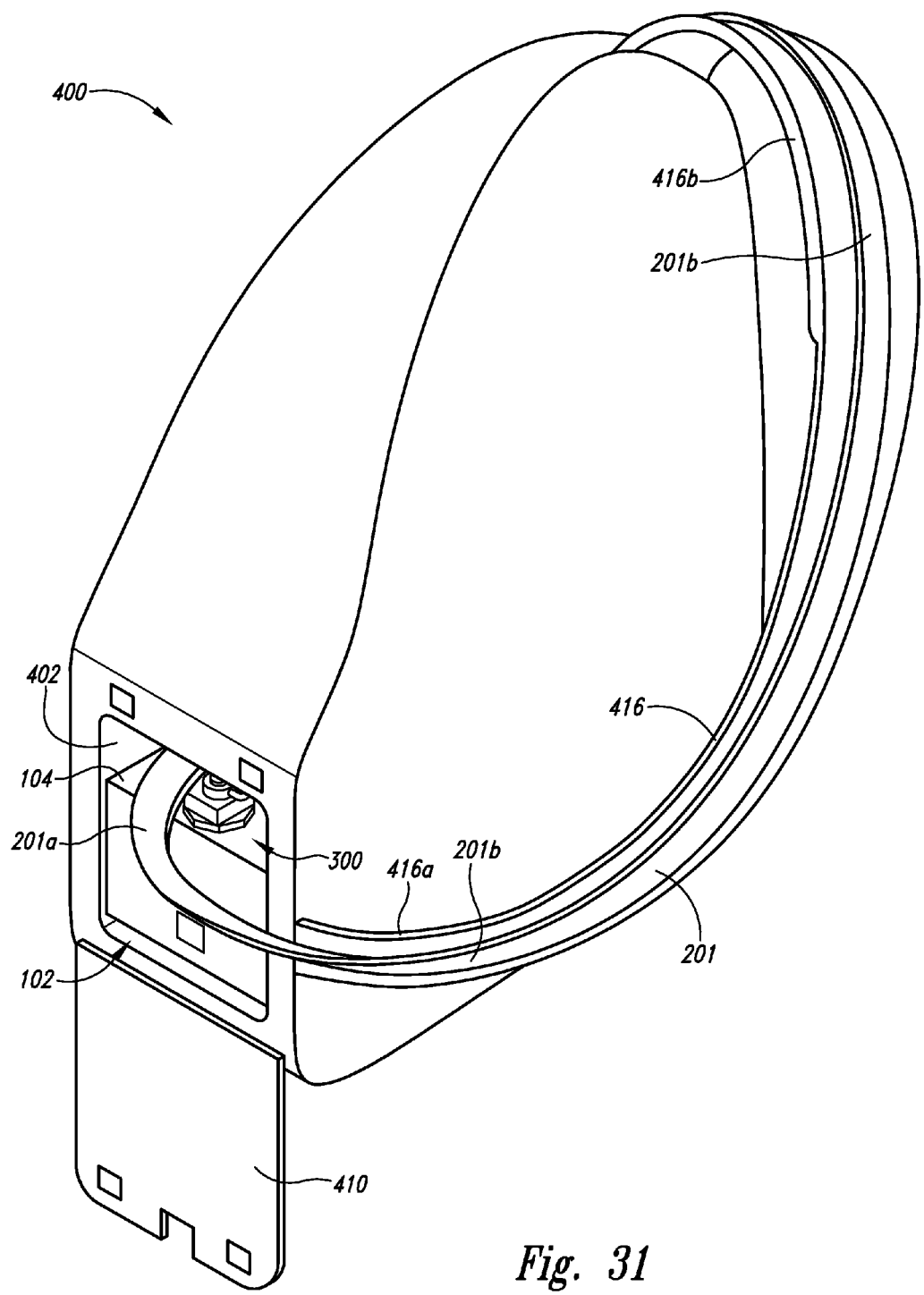

FIG. 31 is a perspective view of the implementation depicted in FIG. 30, showing the camera in a stowed location with an enclosure cover in the open position.

Figure 32:
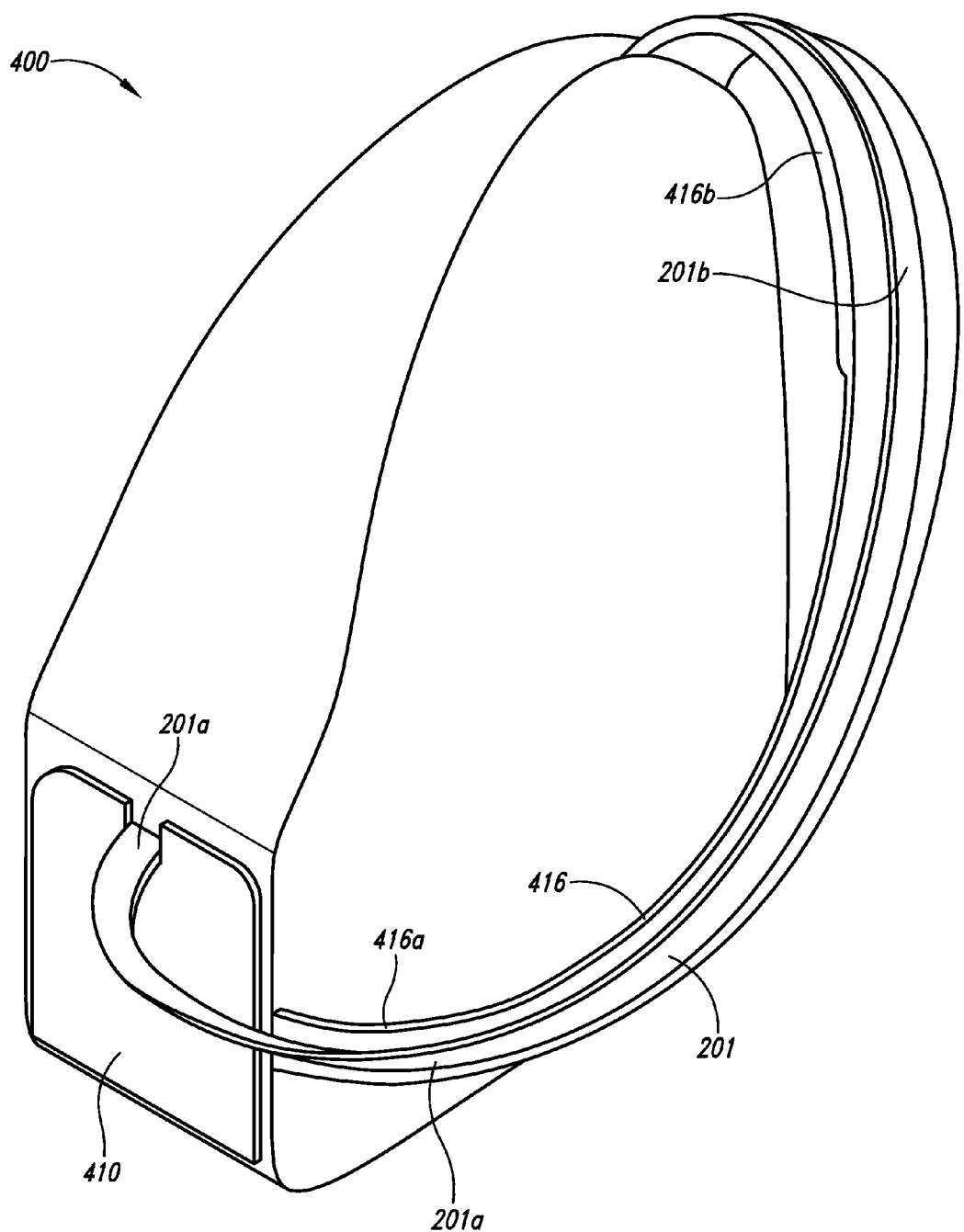

FIG. 32 is a perspective view of the implementation depicted in FIG. 31, showing the enclosure cover in a closed position.

Figure 33:
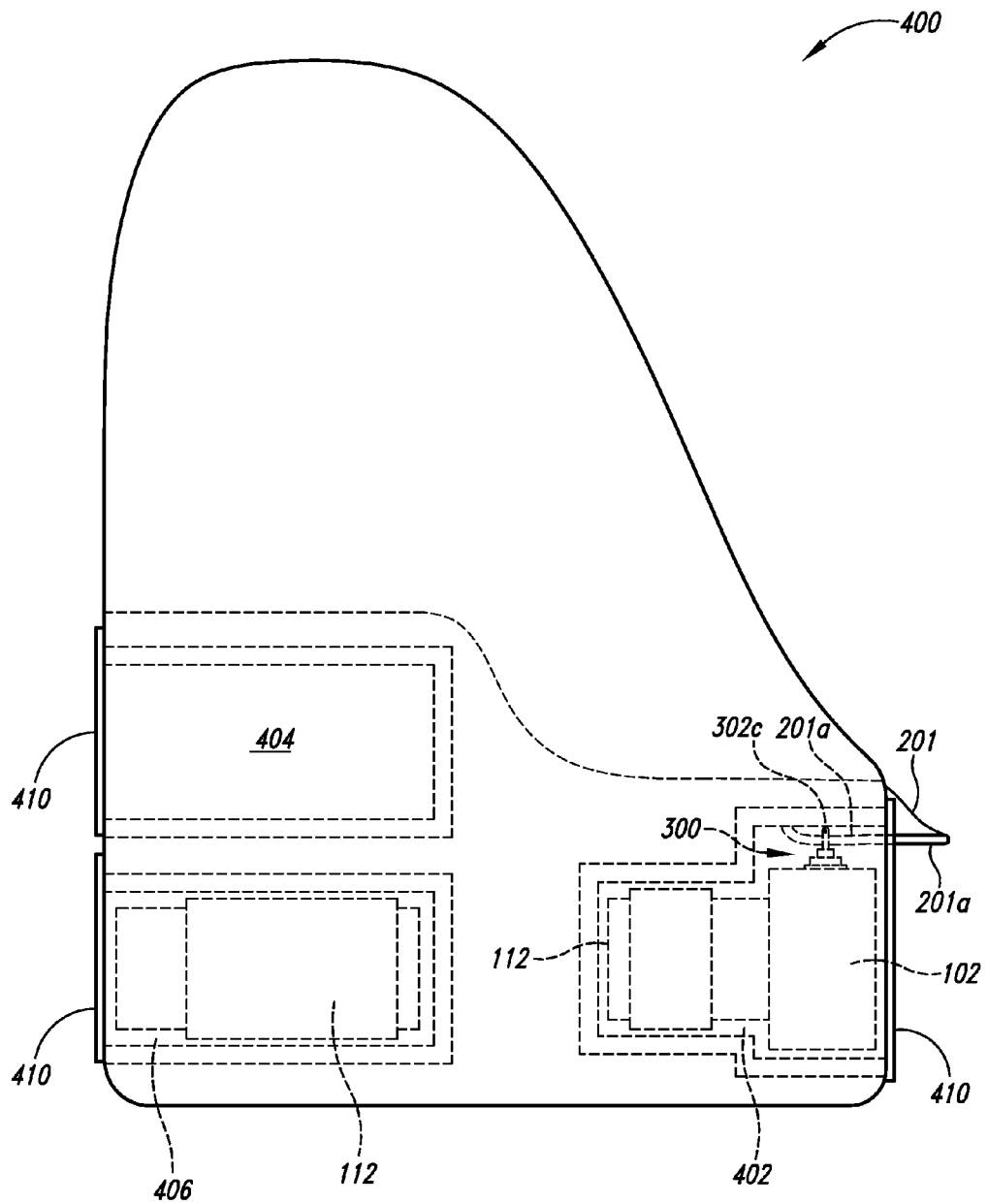

FIG. 33 is an elevational view of the implementation depicted in FIG. 32, further showing a multitude of storage compartments in hidden lines.

Figure 34:
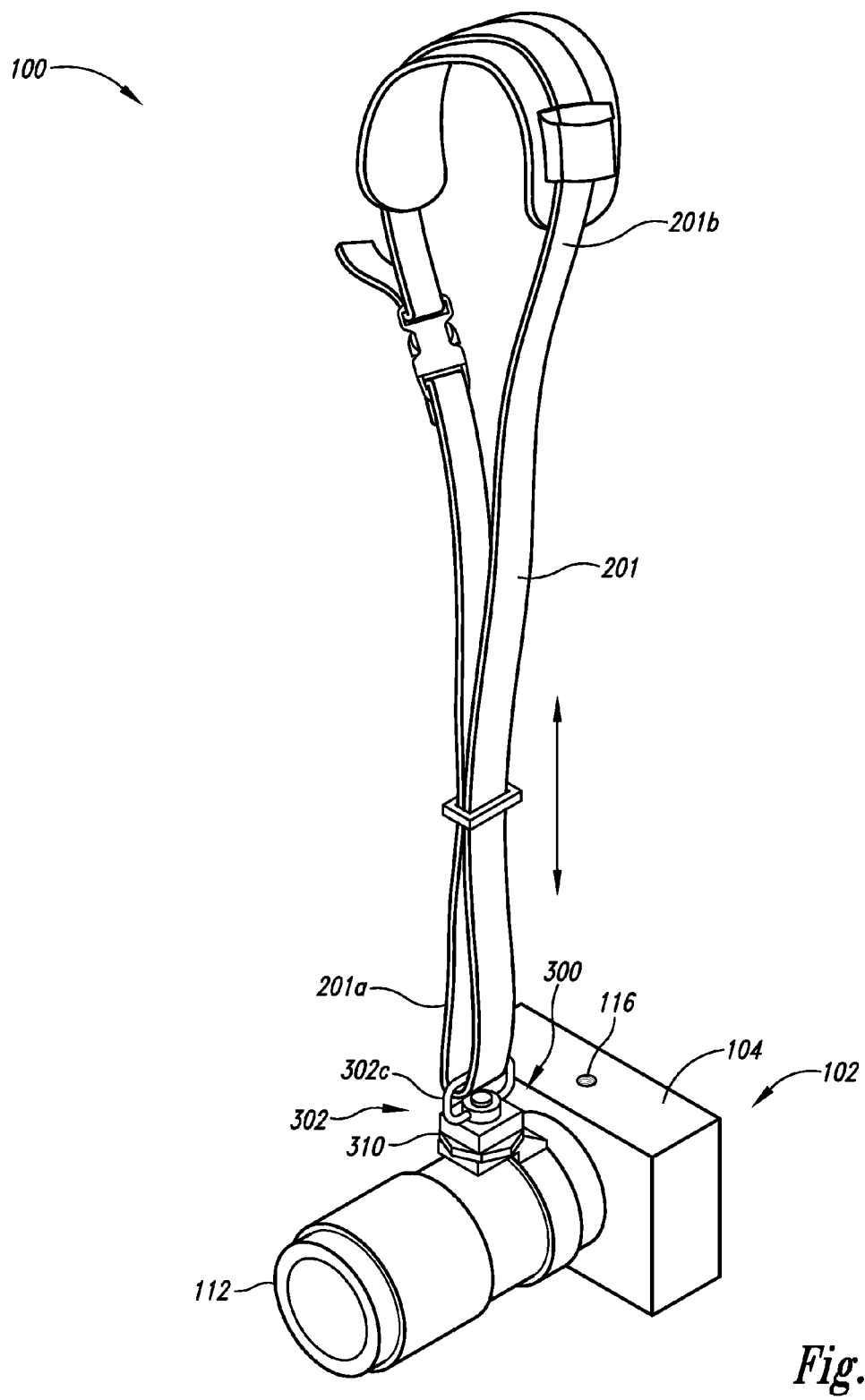

FIG. 34 shows the implementation depicted in FIG. 29, but otherwise having the coupler coupled with the lens based conventional threadable stand socket.

Figure 35:
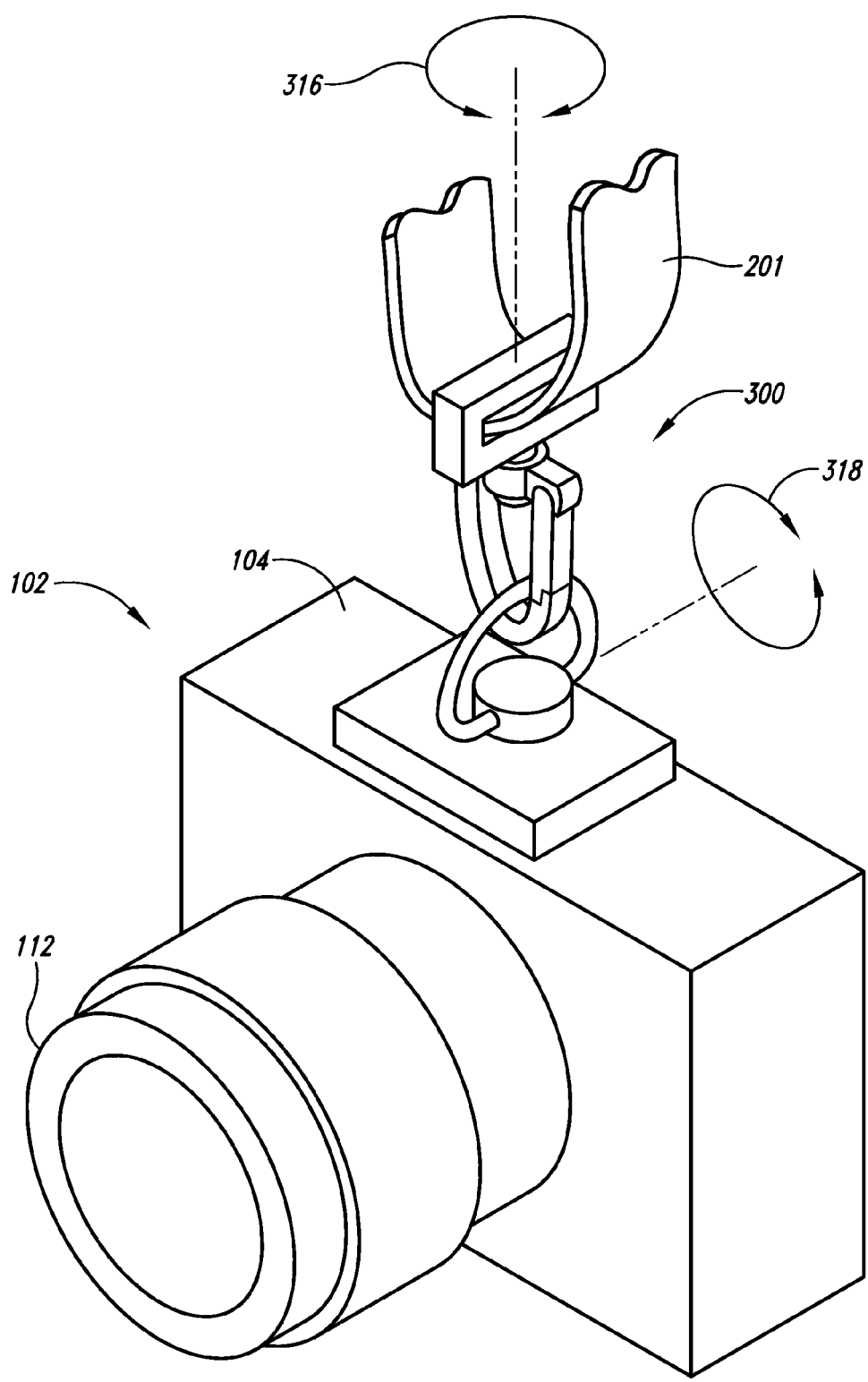

FIG. 35 shows an implementation of the coupler coupled to a camera, and further showing a conventional tripod mounting plate located between the coupler and camera.

Figure 36:
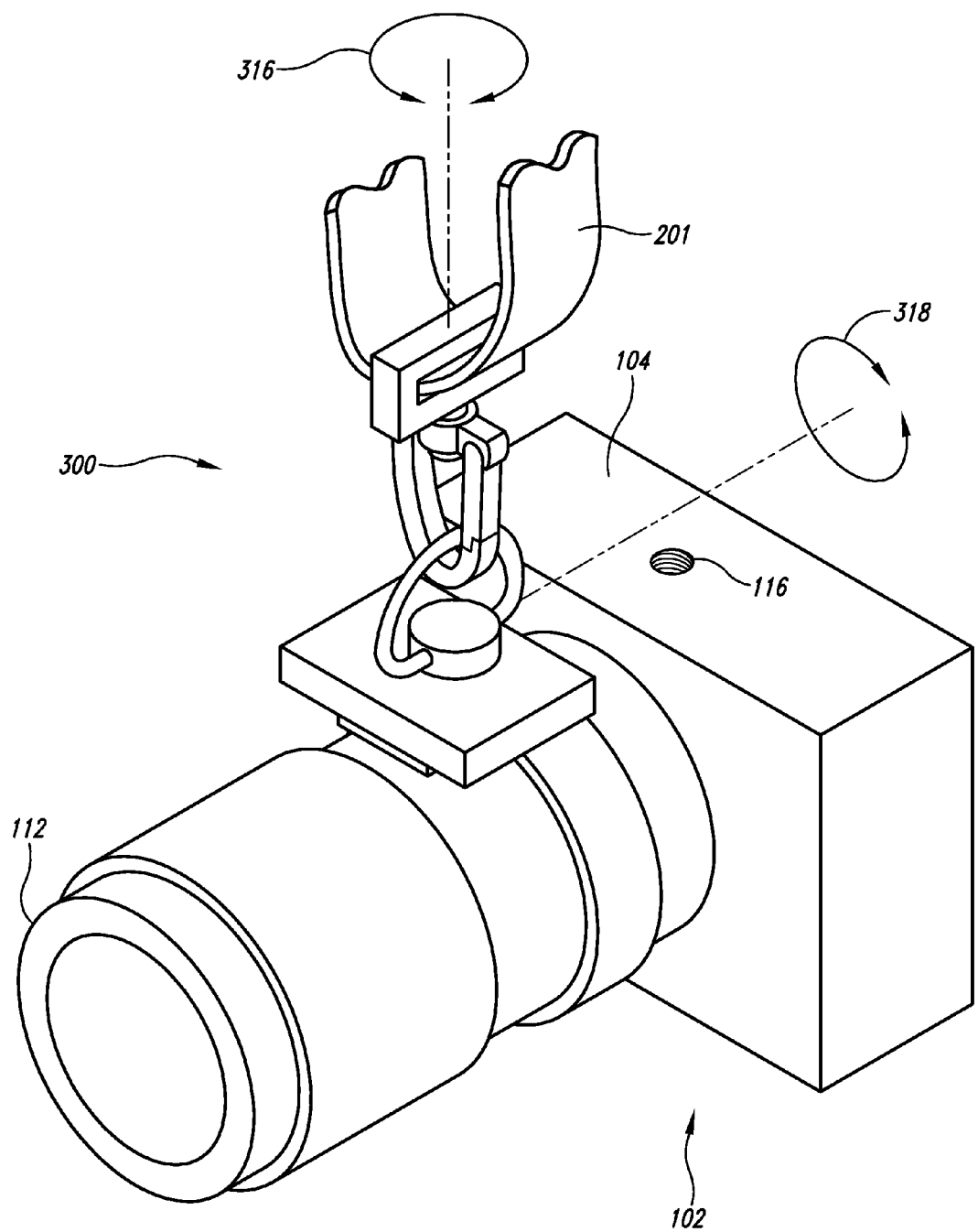

FIG. 36 shows an implementation of the coupler coupled to a camera, and further showing a conventional tripod mounting plate located between the coupler and lens.

Figure 37:
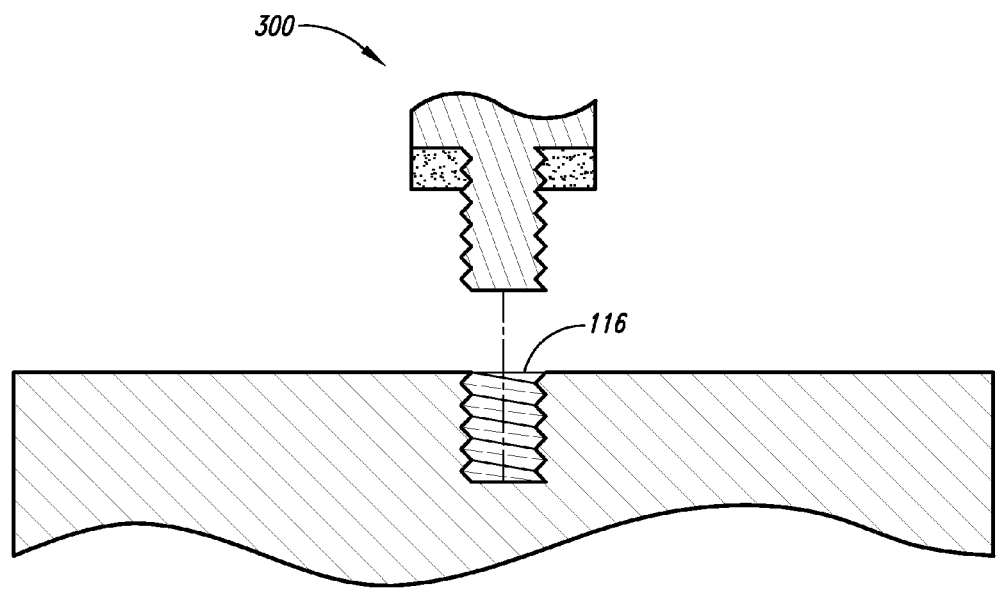

FIG. 37 is a cross sectional view of an exploded assembly of a conventional stand socket and an coupler, showing an alternate locking element located between the coupler and the stand socket.

Figure 38:
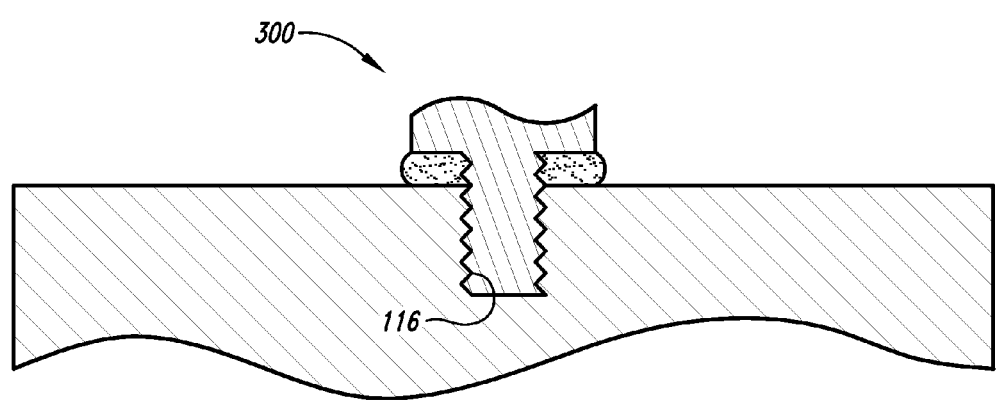

FIG. 38 show the implementation depicted in FIG. 37 in the assembled state, and the locking element promoting a secure engagement between the stand socket and coupler.

Figure 39:
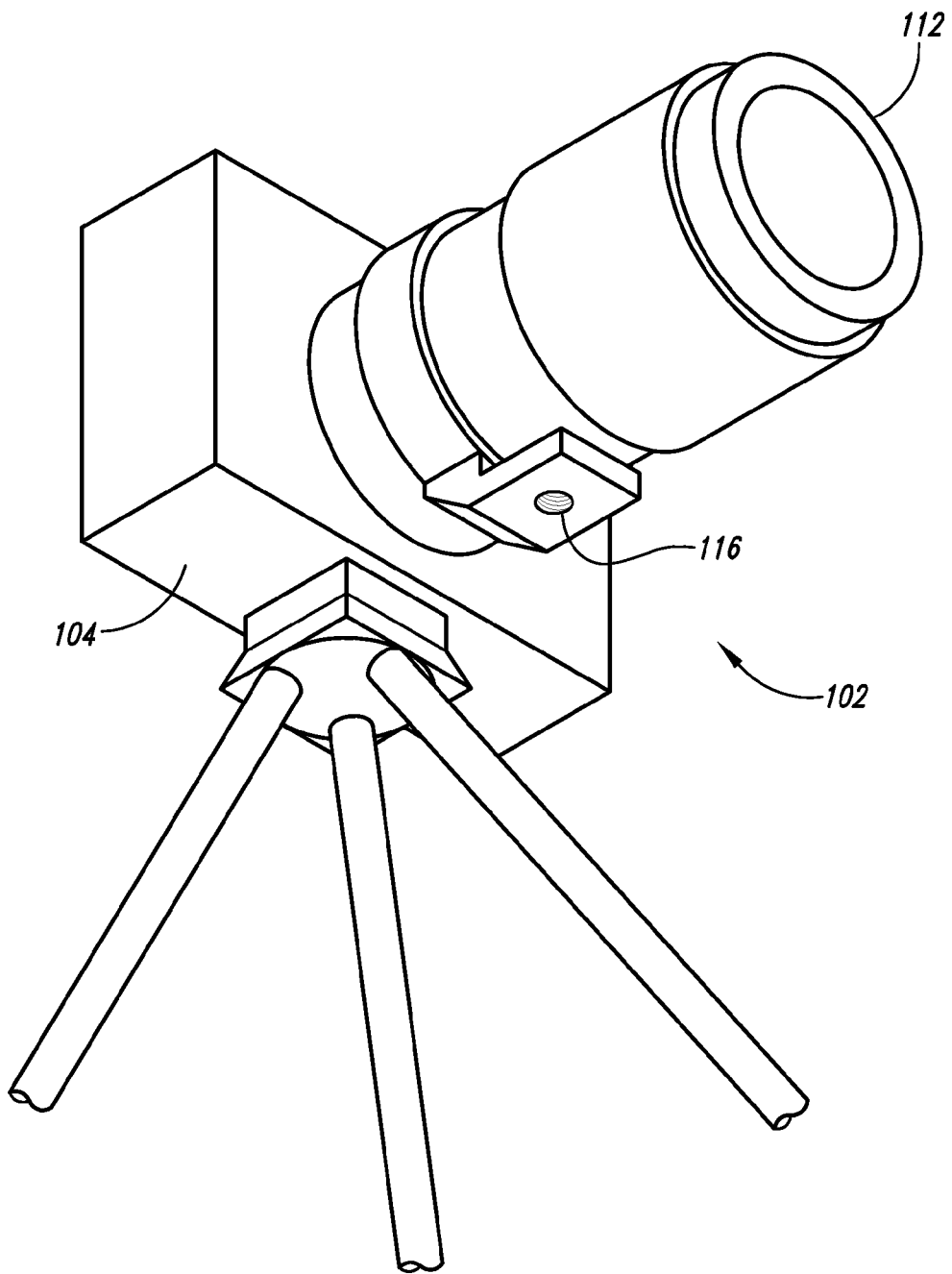

FIG. 39 shows a portion of a tripod coupled with a camera at the stand engagement portion of the bottom of the camera.

DETAILED DESCRIPTION OF THE INVENTION

As discussed herein, an enhanced camera transport system and method includes a strap 201 and coupler 300. The strap is worn by a user 10, typically over the user's shoulder. The coupler is configured to engage with an attachment point on a camera 102 otherwise reserved by engagement with a camera stand such as a tripod, monopod, or the like. Following general camera construction, the attachment point is found on the bottom of the camera. In some implementations, the coupler is slideably attached to the strap to assist with repositioning of the camera from a transport position to a picture taking position by sliding the camera along the strap. Other implementations include an enclosure 400 for storage of the camera while it is not being used.

The strap 201 can be used for retention, support, and/or suspension of the coupler 300, camera 102, and enclosure 400. In some implementations holders, receptacles, pouches, or other containers can be Integrated within the strap to storing items, such as a phone, flashlight, memory, film, batteries, keys, business cards, or other items. The strap can be worn, by the user, diagonally across the torso like a bandolier, or worn vertically from a shoulder. The strap can further include a variety of adjusters for adjusting its length, tension and fit. Further included can be a variety of release mechanisms and fasteners. Still further included in the strap can be a variety of pads or materials to promote comfort for the user, and to further maintain the strap in a proper location for use.

In implementations the coupler 300 can be used to couple the strap 201 to a camera, video camera, or image capture device, and thus further secure the device to a user. The coupler can include a first portion 301a that has a threadable element that engages with a conventional threadable stand socket (such for a tripod or a monopod) of a camera or lens. Further included can be a lock nut or resilient material residing between the coupler and the camera, or lens, to help promote a secure engagement of the coupler to the camera or lens.

The coupler can include a second portion 301b, like a threaded coupler, that slideably engages with the strap 201 that allows the camera 102 to be moved along the length of the strap, from a storage or transport location, to a resting position, and further to a shooting position and back again into the resting position or storage location. Further included in the first portion of the coupler can be additional components to allow for quick engagement and disengagement of the coupler with the strap. The coupler can include a tether to locate the camera a distance away from the strap, and thus a distance from the user. The coupler can by configured to components with a multitude of various rotational axes to promote proper placement of the camera on the user, as well as prevention of binding or tangling of the system.

Compartments can be included in the enclosure 400 for stowing camera components, such as a camera, lens, flash, or other auxiliary camera components in a protected location when not in use, while leaving the components readily accessible for use. The compartments of the enclosure can include closures to envelope the camera gear in a safe environment. To promote a safe environment for the camera components, the storage compartments can be made, in part or in whole, of resilient materials, padded materials, and/or water or chemical resistant materials. Further included in the enclosure can be one or more support straps, such as used on a backpack, handbag, or bandolier style bag. The support straps can also include a variety of adjusters and/or release mechanisms. Further included on the support straps can exist receptacles for holding and permitting access to various items, such as a phone, flashlight, memory, film, batteries, keys, business cards, or other items.

Figure 1:
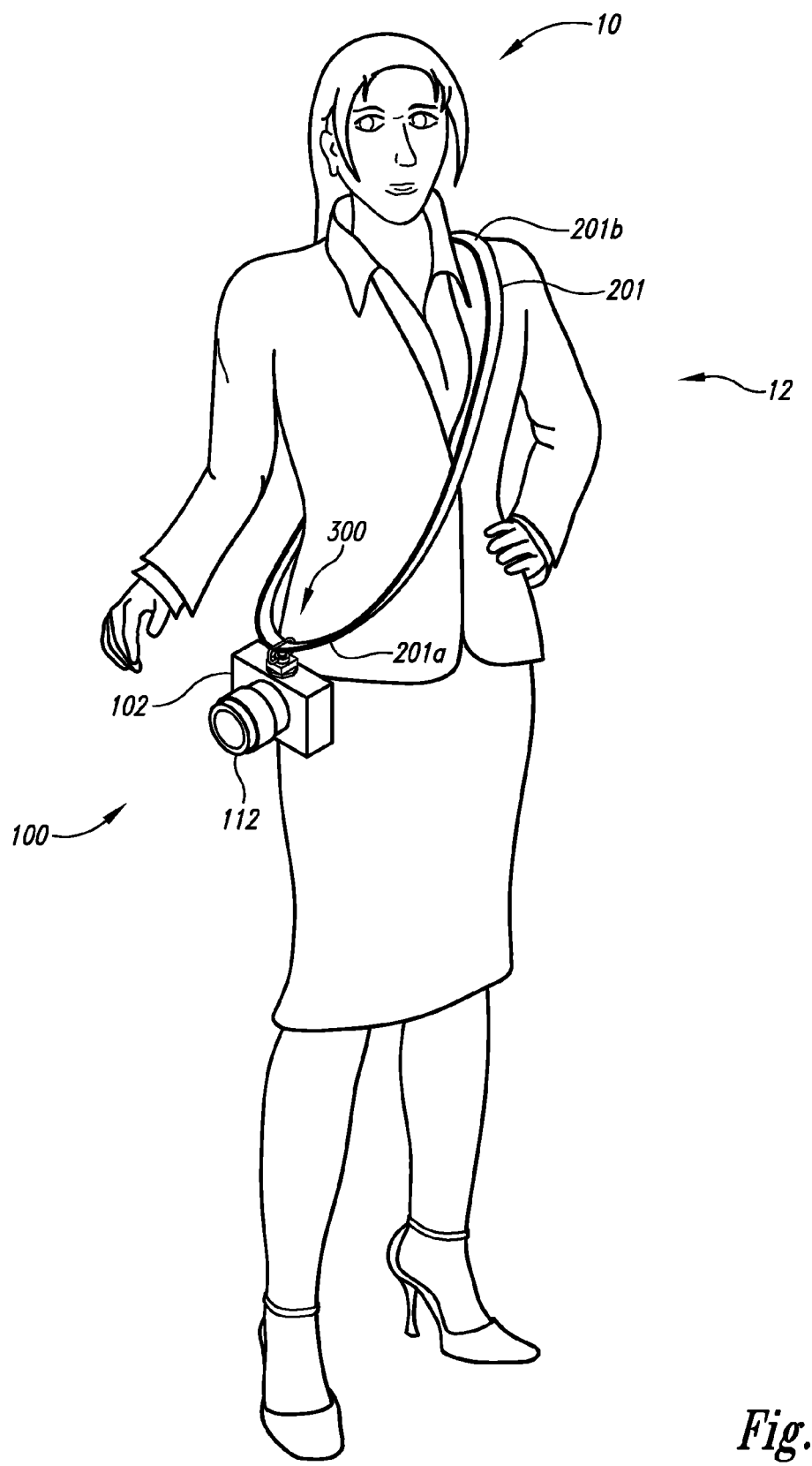
FIG. 1 is a view of an implementation of a camera transport system, shown with the camera in a resting position, and the strap being worn diagonally across the torso of a user.
Figure 2:
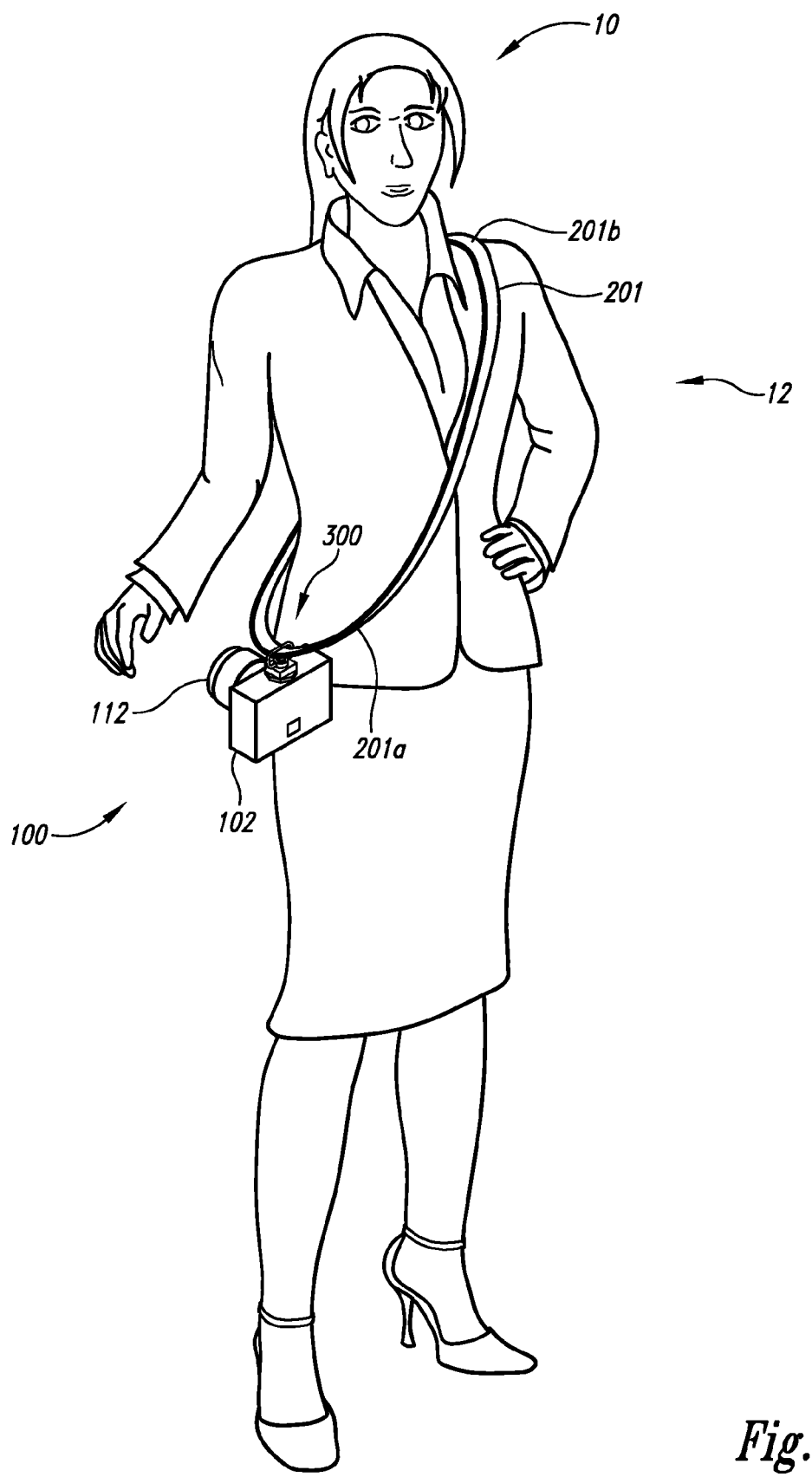
FIG. 2 is a view of the same system depicted in FIG. 1, shown in an alternate resting position.
Figure 3:
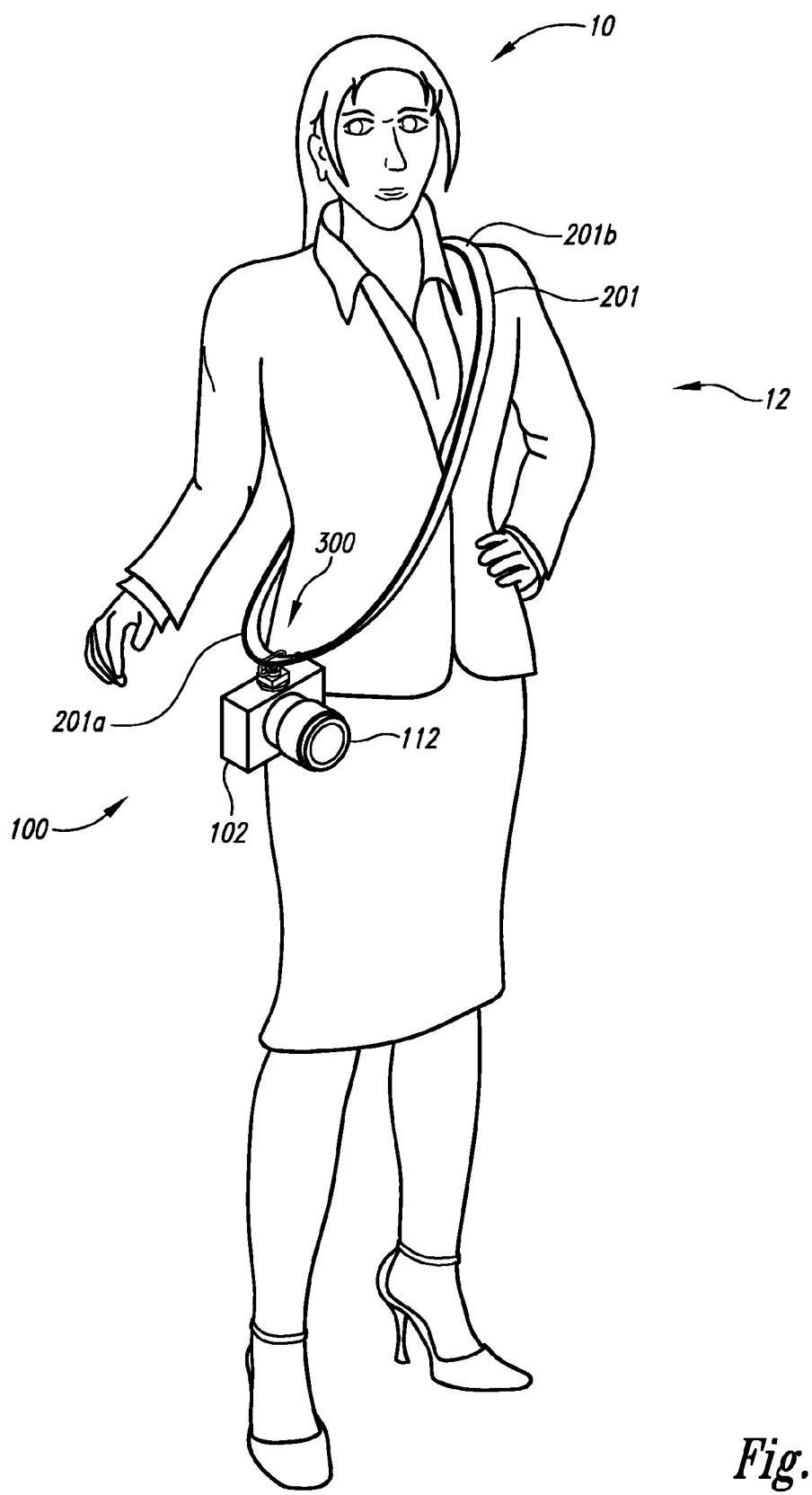
FIG. 3 is a view of the same system depicted in FIG. 1, shown in a further alternate resting position.

As shown in FIG. 1, a system 100 can include of a strap 201 with a first end portion 201a and a second end portion 201b. In some implementations, the strap 201 has a flat sectional profile as shown and in other implementations the strap can have other sectional profiles such as including oblong and round. The strap 201 is formed into a loop and sized to fit over the torso 12 of a user 10, and worn diagonally, like a bandolier. A camera 102, with an engagement portion configured to receive an engagement portion of a tripod, also know as a stand socket in some implementations is slideably, rotatably, pivotally, and releasably coupled to the strap 201 via a coupler 300. The camera 102 can then rest near the first end portion 201a of the strap 201 in various positions as desired by the user, when not in use. Such resting positions for the camera 102 can include hanging topside-down with the lens 112 pointing away from the side of the user (as shown in FIG. 1), towards the rear of the user (as shown in FIG. 2), or towards the front of the user (as shown in FIG. 3).

Figure 4:
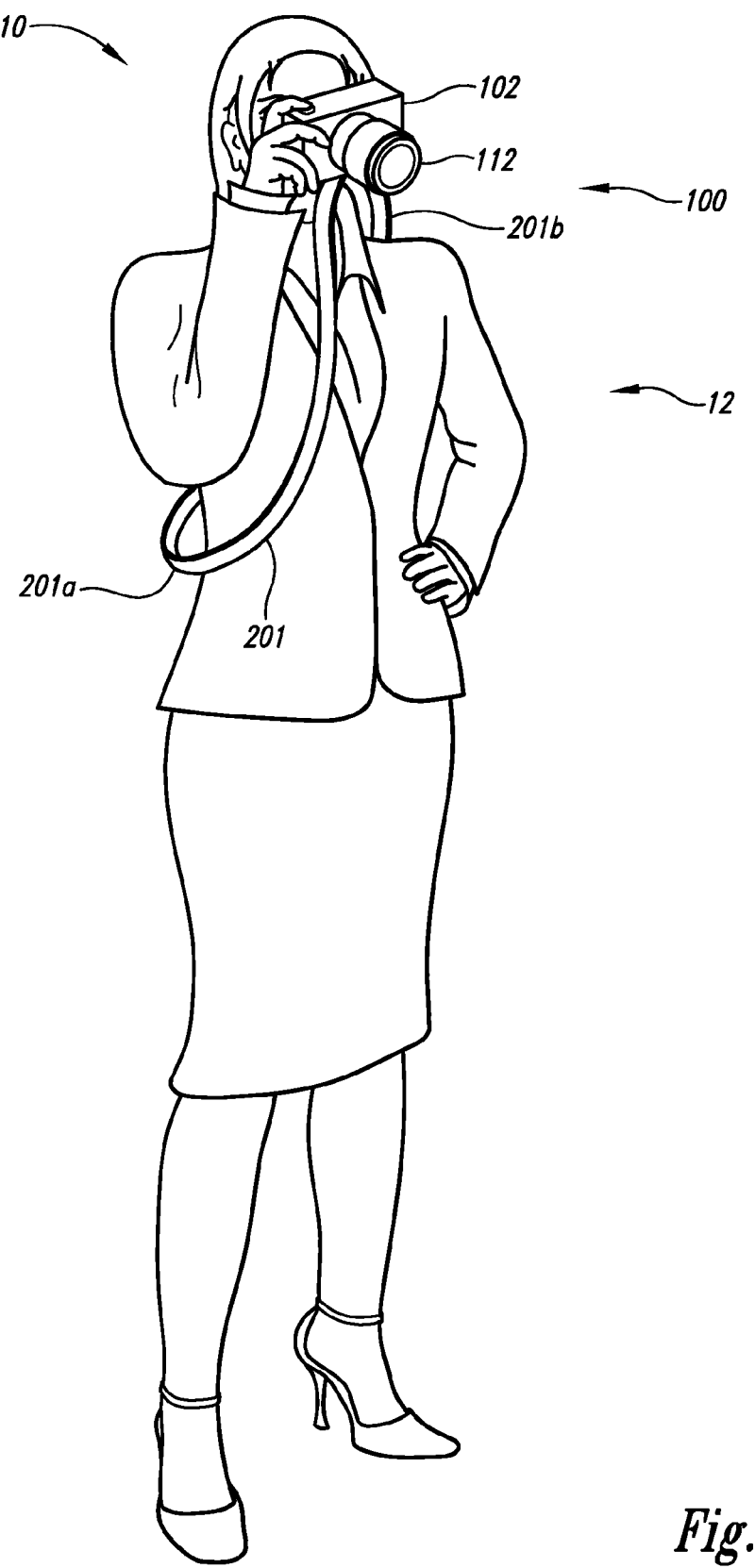
FIG. 4 is a view of the system depicted in FIG. 1, shown with the camera in a shooting position.
Figure 5:
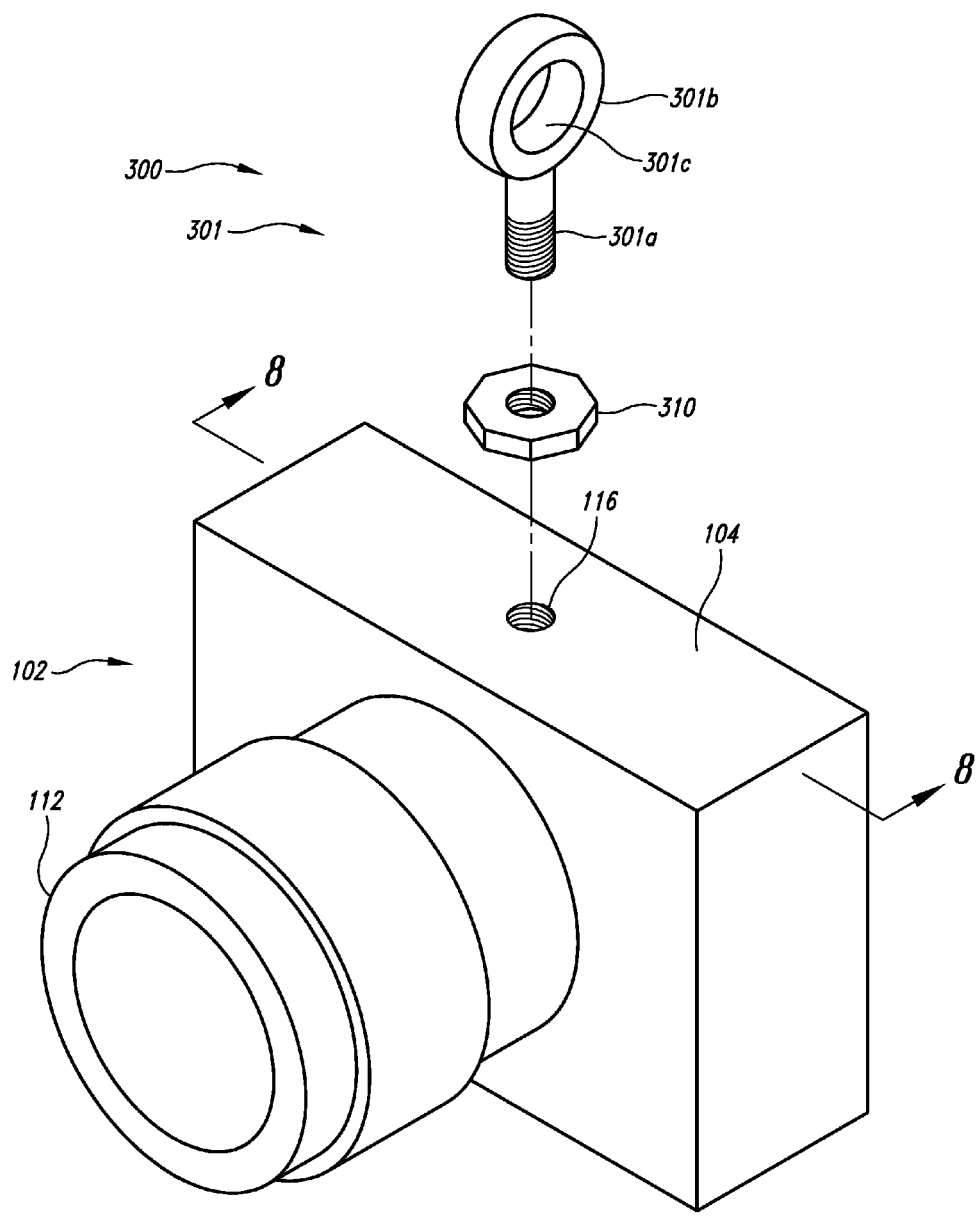
FIG. 5 is a perspective view of an exploded assembly of an implementation of the coupler.
Figure 8:
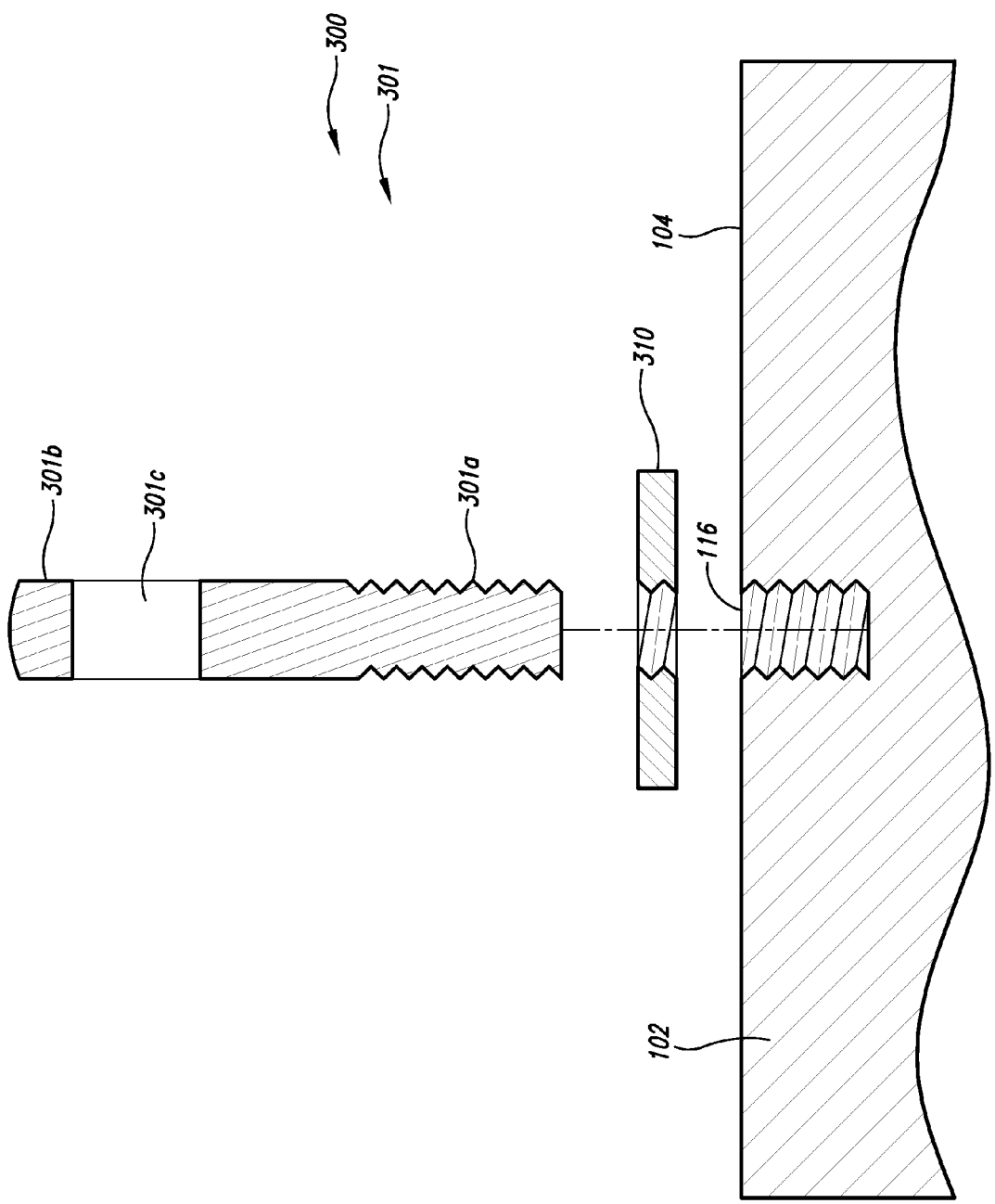
FIG. 8 is a cross sectional view of the implementation depicted in FIG. 5.

The system 100 is depicted in FIG. 4 with the camera 102 topside-up in a shooting position near the second end portion 201b of the strap 201, and being held by the user 10 for facilitating use of the camera to take a picture. A first implementation 301 of the coupler 300 is shown in FIG. 5 and FIG. 8 to be received for engagement by the camera 102. The first implantation 301 has a first portion 301a, a second portion 301b with an aperture 301c. The bottom 104 of the camera 102 having an engagement portion 116, also known as a tripod socket or a stand socket, configured to receive an engagement portion of a tripod, threadably accepts the first portion 301a of the first implementation 301 of the coupler 300. A lock nut 310 is shown to threadably engage with the first portion 301a of the coupler to promote a secure coupling of the first implementation 301 with the stand socket 116 of the camera. The coupler has a second portion 301b shaped to have an aperture 301c to receive a strap 201, not shown, therethrough, and be slideably engagable with the strap.

Figure 6:
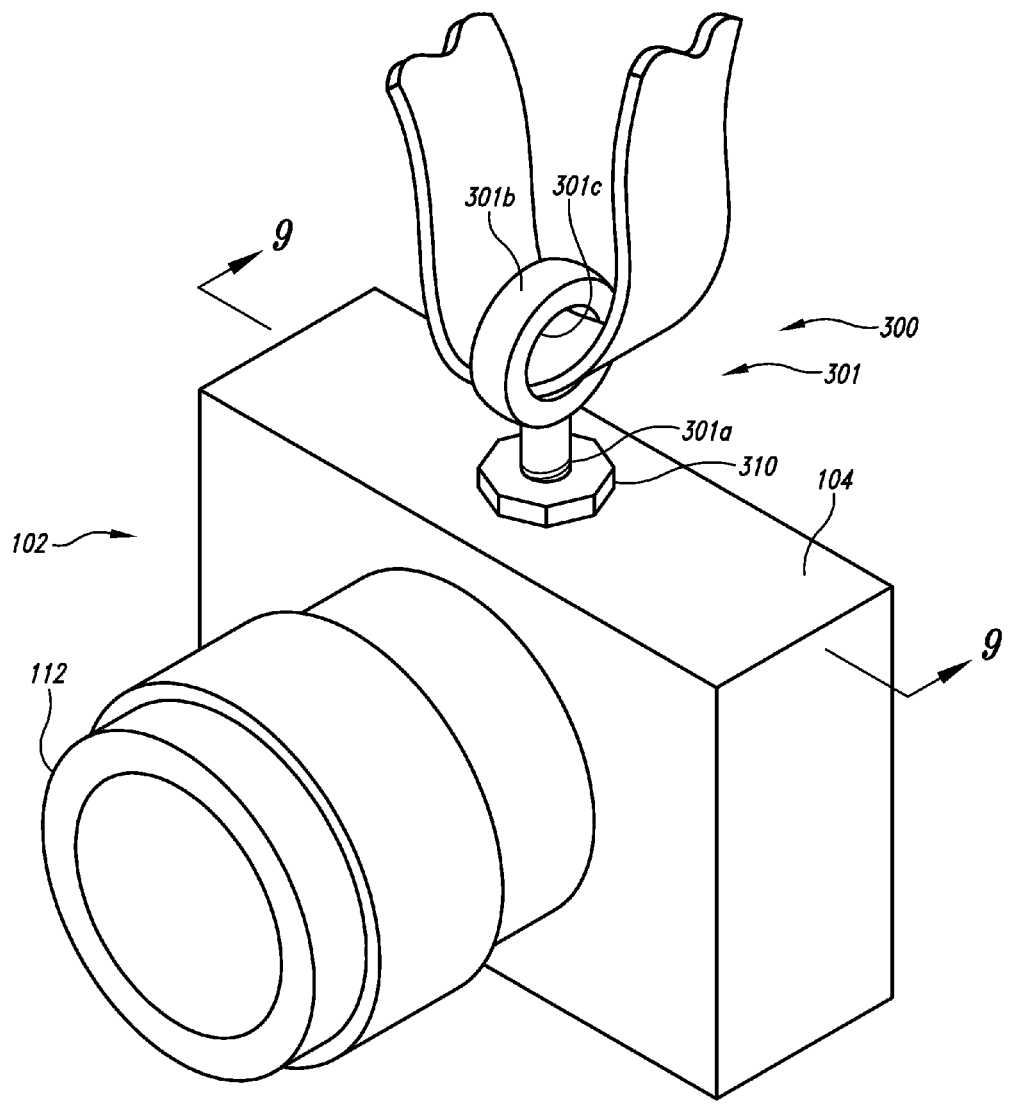
FIG. 6 is a perspective view of the implementation depicted in FIG. 5 secured to a camera, and further showing a strap routed through a coupler.
Figure 9:
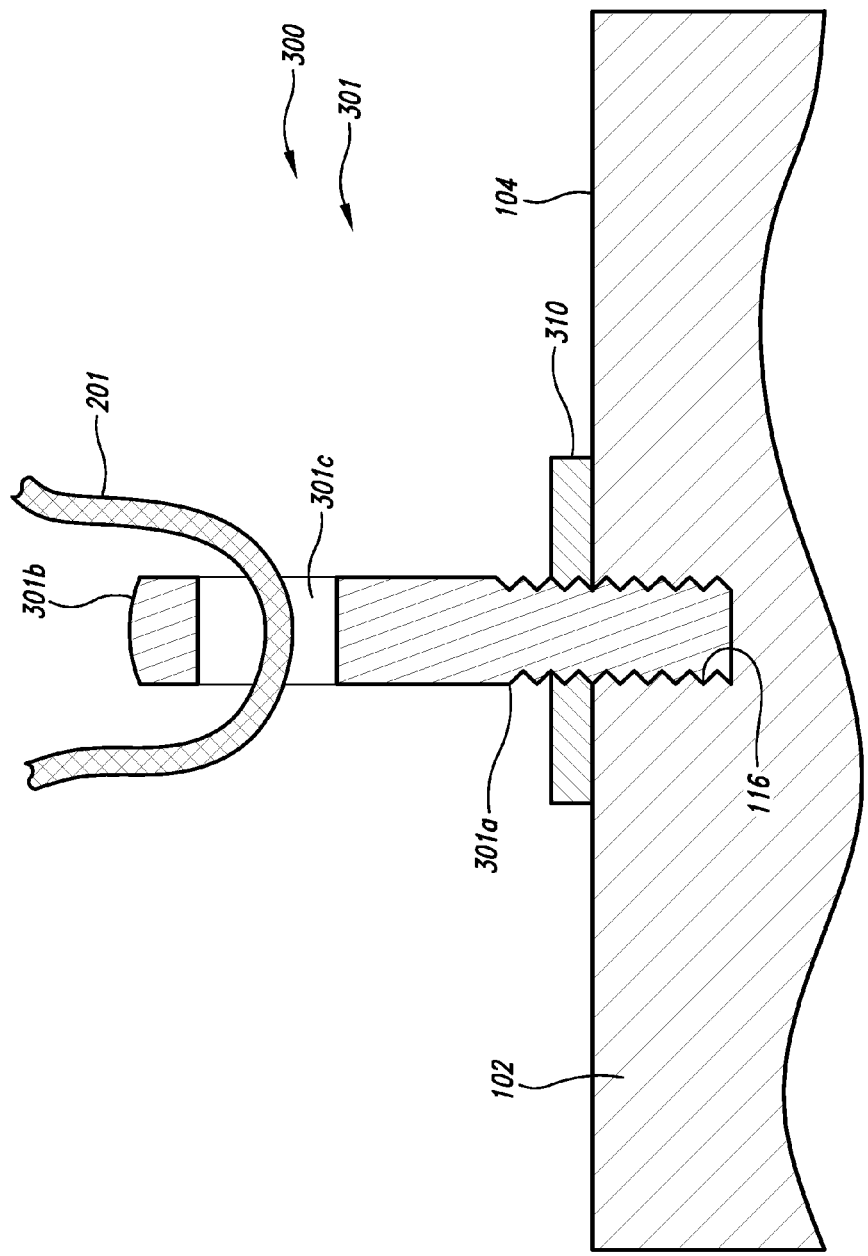
FIG. 9 is a cross sectional view of the implementation depicted in FIG. 6.

Shown in FIG. 6 and FIG. 9 is the assembled first implementation 301 depicted in FIG. 5, coupled to the camera 102, with the lock nut 310 tightened down, and further showing a strap 201 being received by the aperture 301c of the second portion 301b of the first implementation 301 therethrough.

Figure 7:
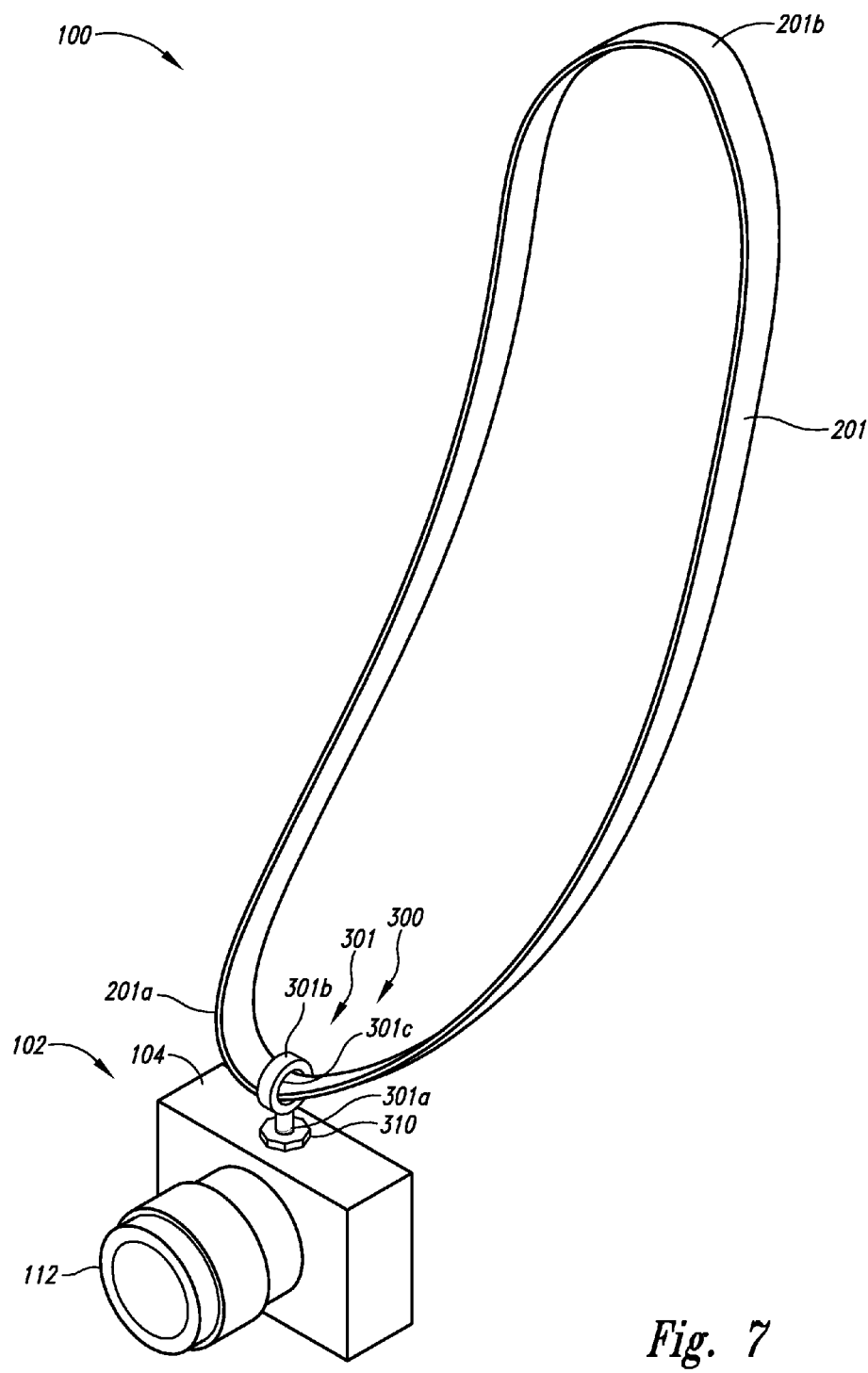
FIG. 7 is a perspective view of the implementation depicted in FIG. 6, showing the system in whole.

FIG. 7 shows the system 100 with the first implementation 301 depicted in FIGS. 5 and 6, having the aperture 301c slideably engaged with a strap 201, and further coupled to a camera 102 via the stand socket 116 of the camera.

A second implementation 302 with a first portion 302a and a second portion 302b of the coupler 300 is shown in FIG. 10. The bottom 104 of the camera 102 having the stand socket 116, threadably accepts the first portion 302a of the second implementation 302 of the coupler 300. A lock nut 310 is shown to threadably engage with the first portion 302a to promote a secure coupling of the second implementation 302 with the stand socket 116 of the camera. The second portion 302b includes a ball lock pin 312 and an aperture 302c. The aperture 302c is shaped to receive the strap 201 therethrough (shown in FIG. 11) and be slideably and pivotally engagable with the strap. The first portion 302a has a ball lock socket 314 sized to accept the ball lock pin 312 for a rotatable and releasable engagement between the first portion 302a and the second portion 302b.

Figure 11:
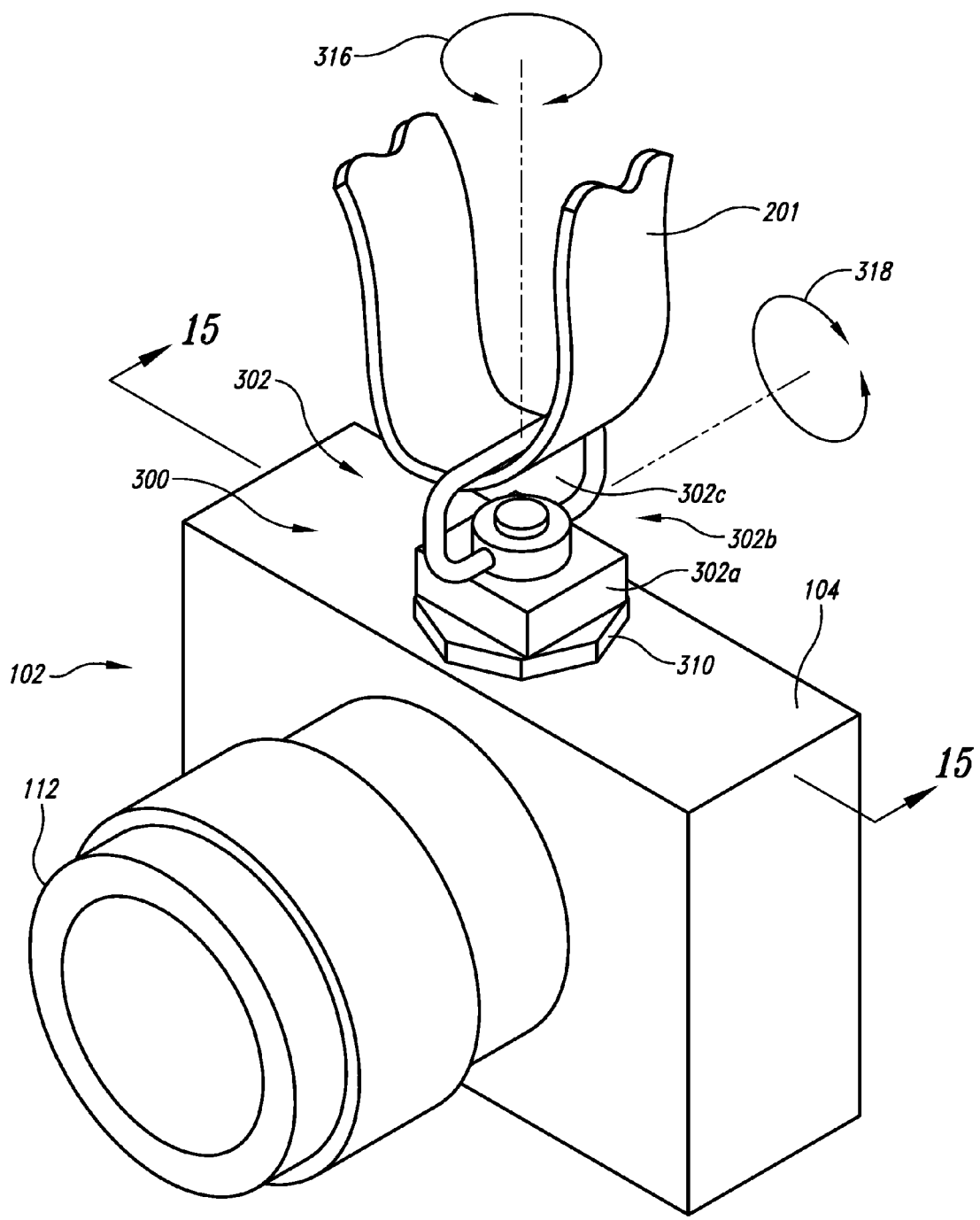
FIG. 11 is a perspective view of the implementation depicted in FIG. 10 secured to a camera, and further showing a strap routed through the coupler.

The second implementation 302 of the coupler 300 is shown in FIG. 11 coupled to the camera 102, with the lock nut 310 tightened down, and further showing the strap 201 being received by the aperture 302c of the second portion 302b of the second implementation 302. To help prevent binding or tangling of the system 100, the second implementation 302 of the coupler 300 allows for rotation between the strap 201 and the camera 102 about the axis 316, while the aperture 302c allows for rotation between the strap and the camera about the axis 318.

Figure 12:
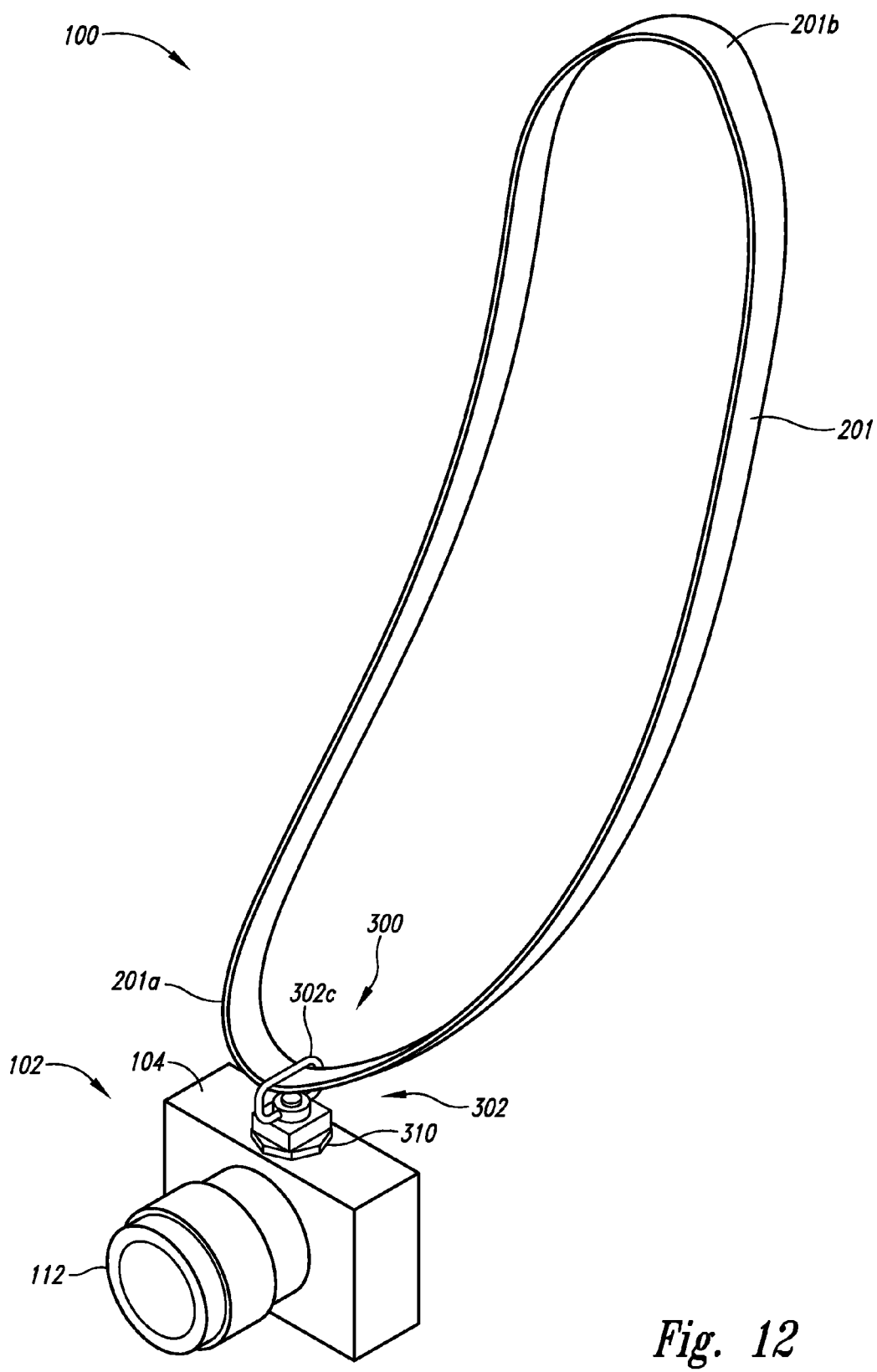
FIG. 12 is a perspective view of the implementation depicted in FIG. 11, showing the system in whole.

FIG. 12 shows the system 100 with the second implementation 302 depicted in FIGS. 10 and 11, having the ball lock pin 312 engaged with the ball lock socket 314, and having the aperture 302c slideably engaged with the strap 201, and further coupled to a camera 102 via the stand socket 116 of the camera.

Figure 13:
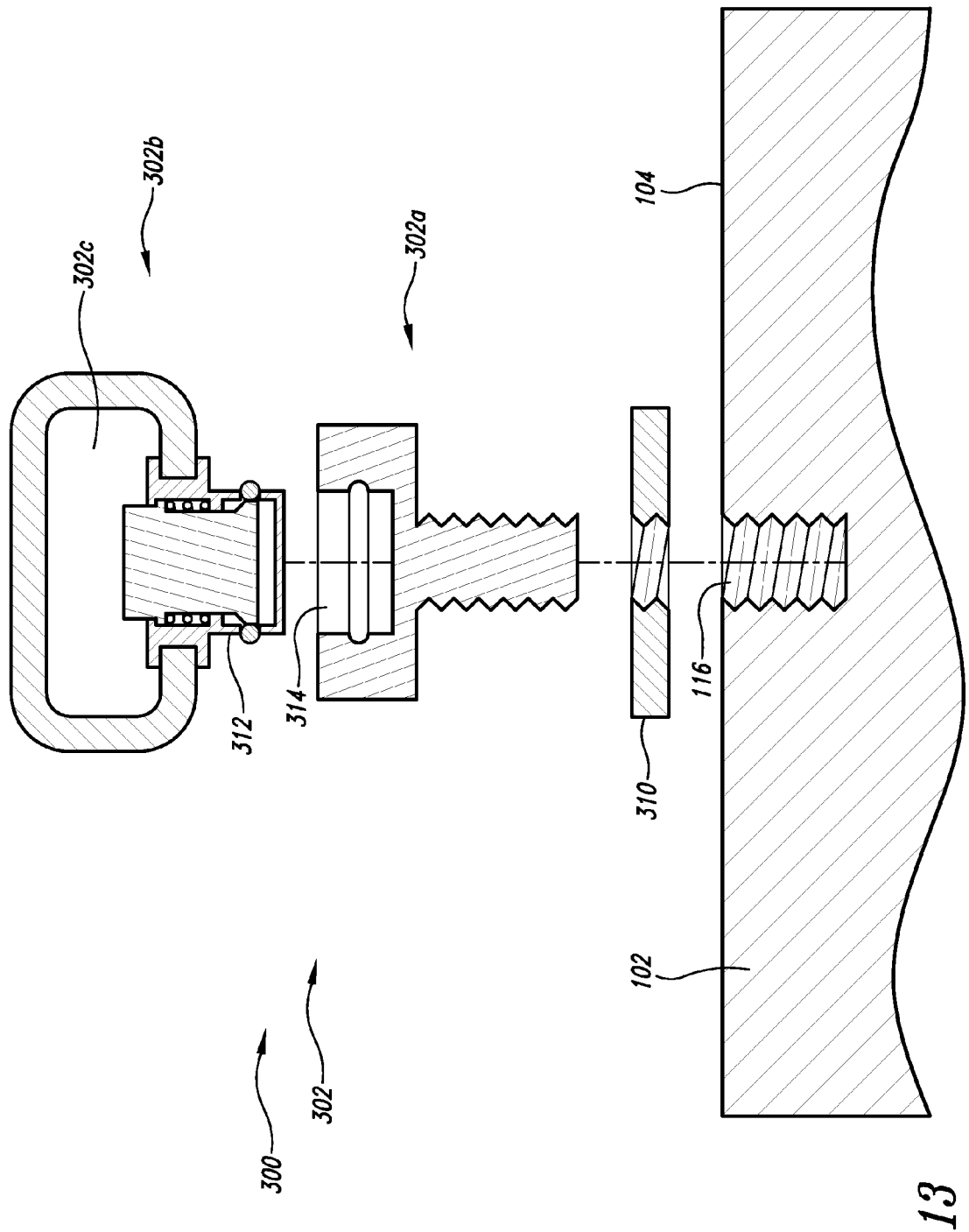

A cross sectional view of FIG. 10 is shown in FIG. 13, and a cross sectional view of FIG. 11 is shown in FIG. 14.

A further alternate implementation of the coupler 300 is represented in FIG. 16 and FIG. 20. Within this implementation the coupler includes of a threadable element 302a for coupling with a conventional threadable stand socket of a camera 102 or lens, and a lock nut 310 for securing the coupler to the stand socket. Included in the coupler 300 is a second portion 302b in the form of a loop for accepting a connector 201c having an integrated coupler 201d for engaging the strap. In this example the connector is of the hook type or carabineer type, and has a gate style mechanism to permit connecting and disconnecting of the connector 201 from the second portion 302b of the coupler 300, which further facilitates removal of the camera 102 from the user 10 without removing the strap 201 from the user.

Shown in FIG. 17 and FIG. 20 is the coupler, coupled to a camera, with the connector coupled to the coupler, and the coupler engaged with the strap. In the assembled state, the connector allows the assembled coupler and camera to rotate relative to the coupler and strap about a first axis. The hook and loop allows the coupler, and camera to rotate relative to the connector portion and strap about a second axis.

FIG. 18 represents an implementation of the system 100 depicted in FIGS. 16 and 17 as a whole, having the camera coupled with the coupler, and the coupler engaged with a strap via the coupler.

Shown in FIG. 21 is an exploded assembly of an alternate implementation of coupling the coupler to a conventional threadable stand socket. The stand socket is mounted to or integral with the lens. All implementations of the coupler can be coupled to the lens in the same manner as they are coupled to the camera's stand socket.

FIG. 22 is the assembled implementation depicted in FIG. 21, coupled to a lens, with the connector coupled to the coupler, and the coupler engaged with the strap. In the assembled state, the connector allows the assembled coupler and camera to rotate relative to the coupler and strap about a first axis. The coupler allows the assembled connector, coupler, and camera to rotate relative to the strap about a second axis.

FIG. 23 represents an implementation of the system 100 depicted in FIGS. 21 and 22 as a whole, having the camera coupled with the coupler, and the coupler engaged with a strap via the coupler.

FIG. 24 shows a further alternate implementation of coupling the coupler to a camera. The coupler is coupled to the camera's conventional strap mount loops located opposing each other on the first side and second side of the camera. A number of ties attach the connector to the camera's strap mount loops. A connector is shown in the engaged state, connecting the ties to a strap. In this example the connector is of the side release type, but can be any type of connector, in example: a ball lock pin, carabineer, hook and loop, etc.

FIG. 25 shows an implementation of the system 100 as having an coupler 300 engaged with the strap 201. The strap can have a padded portion to permit comfort for the user, and can further utilize a frictional material to maintain the strap in a proper location for use of the camera. Located on the strap can exist a variety of receptacles for holding and permitting access to various items, such as a phone, flashlight, memory, film, batteries, keys, business cards, or other items. Further included in the strap can be one or more adjusters for adjusting its length, tension and fit. Still further included can be a variety of release mechanisms, in this example a side release is shown.

FIG. 26 shows an alternate implementation of the system 100 as having a tether located between the strap and the coupler, for the purpose of locating the camera a distance from the strap. This can facilitate proper use of the camera by the user. The tether can further include a coupler for engaging the strap.

As shown in FIG. 27 and FIG. 28, the system 100 can be worn by the user vertically from the shoulder, and the camera can rest in a desired position allowed by the first axis of rotation and second axis of rotation included within the coupler.

FIG. 29 shows an alternate implementation of the system 100 depicted in FIG. 28, with the strap having a padded portion to permit comfort for the user, and can further utilize a frictional material to maintain the strap in a proper location for use. Located on the strap can exist a variety of receptacles for holding and permitting access to various items, such as a phone, flashlight, memory, film, batteries, keys, business cards, or other items. Further included in the strap can be one or more adjusters for adjusting its length, tension and fit. Still further included can be a variety of release mechanisms, in this example a side release is shown. Still further included can be a slide to adjust the fit of the strap, and to further alter the characteristics of the strap from a glide strap to a fixed strap.

FIGS. 30-33 shows an implementation of the system 100, as including an enclosure 400 having a first interior 402, a second interior 404, and a third interior 406 all being covered by closures or covers 410. The enclosure 400 can be used for stowing camera components, such as a camera, lens, flash, or other auxiliary camera components in a protected location when not in use, while leaving the components readily accessible for use. As shown, the first end portion 201a of the strap 201 is positioned in the first interior 402 to allow for the camera 102 to be moved into the first interior (such as by sliding along the strap 201 without detaching the camera from the strap 201. A second strap 416 having a first end portion 416a and a second end portion 416b is used to wear the enclosure 400 over a shoulder. The second end portion 201b of the strap 201 is shown in be fastened near the second end portion 416b of the second strap 416 so that the strap 201 can follow the contour of the second strap while the enclosure 400 is being worn.

The closures can include the use of snaps, zippers, drawcord, hook and loop (Velcro), or other such fasteners deemed necessary to secure the closures in a closed position. To promote a safe environment for the camera components, the storage compartments can be made, in part or in whole, of resilient materials, padded materials, and/or water or chemical resistant materials. Further included in the enclosure can be one or more support straps, such as used on a backpack, handbag, or bandolier style bag. In this example the support strap is of the bandolier type. The support straps can also include a variety of adjusters and/or release mechanisms (not shown). Further included on the support straps can exist receptacles (not shown) for holding and permitting access to various items, such as a phone, flashlight, memory, film, batteries, keys, business cards, or other items. Further included in the enclosure can be auxiliary storage for the stowing of various items.

FIG. 31 shows the implementation of the system 100 depicted in FIG. 30, but with the camera in a stowed location within a compartment.

FIG. 32 shows the same implementation of the system 100 depicted in FIG. 31, but with the closure in a closed position.

FIG. 33 is a rear view of the system 100 depicted in FIG. 32. Further shown is a number of compartments (shown in hidden lines) stowing various camera components. Auxiliary storage is also shown.

FIG. 34 shows the implementation depicted in FIG. 29, but otherwise having the coupler coupled with the lens based conventional threadable stand socket.

FIG. 35 shows an implementation of the coupler coupled to a camera, and further showing a conventional tripod mounting plate located between the coupler and camera. This allows the coupler to remain intact with the camera, while still permitting use of the tripod mounting plate for mounting to a tripod.

FIG. 36 shows an implementation of the coupler coupled to a camera, and further showing a conventional tripod mounting plate located between the coupler and lens. This allows the coupler to remain intact with the lens, while still permitting use of the tripod mounting plate for mounting to a tripod.

FIG. 37 is a cross sectional view of an exploded assembly of a conventional stand socket and an coupler, showing an alternate locking element located between the coupler and the stand socket. The locking element can be made of a frictional and/or resilient material, which can further have a compressable or noncompressable nature.

FIG. 38 show the implementation depicted in FIG. 37 in the assembled state, and the locking element promoting a secure engagement between the stand socket and coupler.

FIG. 39 shows a portion of a tripod coupled with a camera at the stand engagement portion of the bottom of the camera.

ASPECTS

1. For a camera having at least one engagement portion each configured to receive an engagement portion of a stand, a system for coupling with the engagement portion of the camera, the system comprising:
   a first strap; and
   a coupler having a first portion and a second portion, the first portion of the coupler sized and shaped to engage with the engagement portion of camera, the second portion of the coupler sized and shaped to engage with the first strap.

2. The system of aspect 1, further including:
   an enclosure having an interior area with an aperture and an exterior; and
   a shoulder strap with a first end portion and a second end portion attached to the exterior of the enclosure, the first end portion of the shoulder strap attached closer to the aperture and the second end of the shoulder strap attached farther from the aperture, the first strap having a first end portion attached to the enclosure inside the interior area.

3. The system of aspect 1, wherein the second portion of the coupler in configured to slideably engage with the first strap.

4. The system of aspect 3, wherein the first strap has a second end portion attached to the shoulder strap adjacent to the second end of the shoulder strap.

5. The system of aspect 4, wherein the enclosure further includes a covering to cover the aperture.

6. The system of aspect 1, wherein the second portion of the coupler is rotatably couplable to the first portion of the coupler.

7. The system of aspect 1, wherein the first strap is sized to fit over a human torso.

8. The system of aspect 1, wherein the first strap is formed into a loop.

9. The system of aspect 1 further includes a second strap and a strap coupler, the first strap being engaged with the second strap via the first strap coupler.

10. The system of aspect 1, wherein the second portion of the coupler includes a loop to receive the first strap inserted therethrough.

11. The system of aspect 10, wherein the first portion of the coupler includes a loop and the second portion of the coupler includes a hook, the hook of the second portion shaped to engage the loop of the first portion.

12. The system of aspect 11, wherein the loop and the hook of the second portion of the coupler are rotatably engaged.

13. The system of aspect 12, wherein the hook of the second portion of the coupler includes a safety clasp.

14. The system of aspect 11, wherein the first strap has a flat shape and the loop has an elongated shape.

15. The system of aspect 11, wherein the second portion of the coupler includes a base rotatably couplable to the first portion of the coupler and the loop is pivotally coupled to the base.

16. The system of aspect 11, wherein the second portion of the coupler includes a ball lock pin and the first portion of the coupler includes a ball lock socket, the ball lock pin being releasably couplable with the ball lock socket.

17. The system of aspect 11, wherein the second portion of the coupler is releasably couplable with the first portion of the coupler.

18. The system of aspect 1, wherein the engagement portion of the camera is a stand socket, the first portion of the coupler sized and shaped to engage with the stand socket of the camera.

19. The system of aspect 18, wherein the stand socket is threaded and the first portion of the coupler is threaded to threadably engage with the stand socket.

20. For a camera having a body with a bottom having an engagement portion, a system comprising:
    a first strap; and
    a coupler having a first portion and a second portion, the first portion of the coupler sized and shaped to engage with the engagement portion of camera, the second portion of the coupler sized and shaped to engage with the first strap.

21. The system of aspect 20, wherein second portion of the coupler is configured to slideably engage with the first strap.

22. A system comprising:
    a camera having an engagement portion configured to receive an engagement portion of a stand:
    a first strap; and
    a coupler having a first portion and a second portion, the first portion of the coupler configured to engage with the engagement portion of camera, the second portion of the coupler configured to engage with the first strap.

23. The system of aspect 22, further including:
    an enclosure having an interior area with an aperture and an exterior; and
    a shoulder strap with a first end portion and a second end portion attached to the exterior of the enclosure, the first end portion of the shoulder strap attached closer to the aperture and the second end of the shoulder strap attached farther from the aperture, the first strap having a first end portion attached to the enclosure inside the interior area.

24. The system of aspect 22, wherein the second portion of the coupler is configured to slideably engage with the first strap.

25. The system of aspect 24, wherein the first strap has a second end portion attached to the shoulder strap adjacent to the second end of the shoulder strap.

26. The system of aspect 24, wherein the enclosure further includes a covering to cover the aperture.

27. The system of aspect 22, wherein the second portion of the coupler is rotatably couplable to the first portion of the coupler.

28. The system of aspect 22, wherein the first strap is sized to fit over a human torso.

29. The system of aspect 22, wherein the first strap is formed into a loop.

30. The system of aspect 22, further includes a second strap and a strap coupler, the first strap being engaged with the second strap via the first strap coupler.

31. The system of aspect 22, wherein the second portion of the coupler includes a loop to receive the first strap inserted therethrough.

32. The system of aspect 30, wherein the first portion of the coupler includes a loop and the second portion of the coupler includes a hook, the hook of the second portion shaped to engage the loop of the first portion.

33. The system of aspect 31, wherein the loop and the hook of the second portion of the coupler are rotatably engaged.

34. The system of aspect 31, wherein the hook of the second portion of the coupler includes a safety clasp.

35. The system of aspect 30, wherein the first strap has a flat shape and the loop has an elongated shape.

36. The system of aspect 30, wherein the second portion of the coupler includes a base rotatably couplable to the first portion of the coupler and the loop is pivotally coupled to the base.

37. The system of aspect 30, wherein the second portion of the coupler includes a ball lock pin and the first portion of the coupler includes a ball lock socket, the ball lock pin being releasably couplable with the ball lock socket.

38. The system of aspect 30, wherein the second portion of the coupler is releasably couplable with the first portion of the coupler.

39. The system of aspect 22, wherein the engagement portion of the camera is a stand socket, the first portion of the coupler sized and shaped to engage with the stand socket of the camera.

40. The system of aspect 30, wherein the stand socket is threaded and the first portion of the coupler is threaded to threadably engage with the stand socket.

41. A system comprising:
a camera having a body with a bottom having an engagement portion;
a first strap; and
a coupler having a first portion and a second portion, the first portion of the coupler configured to engage with the engagement portion of camera, the second portion of the coupler configured to engage with the first strap.

42. The system of aspect 41, wherein the second portion of the coupler is configured to slideably engage with the first strap.

43. A system comprising:
a camera having an attachment point to engage with a stand; and
a strap coupled with the camera at the attachment point.

44. The system of aspect 43, wherein the camera is slideably attached to the strap.

45. A method comprising:
providing a camera with an attachment point for a stand;
attaching a coupler to the attachment point; and
attaching a strap to the coupler.

46. The method of aspect 45, wherein attaching a strap includes slideably attaching the strap to the coupler.

47. A method comprising:
providing a camera having a bottom and a top, the camera having an attachment point at the bottom of the camera;
hanging the camera top-side down from a shoulder of a human body by a strap coupled to the attachment point;
grabbing the camera with at least one hand of the human body; and
positioning the camera right-side up.

48. The method of aspect 47, wherein positioning the camera includes sliding the camera along the strap.

49. A method comprising:
reaching behind a human torso to grab a camera;
pulling the camera out of an enclosure located behind a human torso; and
sliding the camera along a strap attached to the enclosure to aim the camera.

50. For a camera having one engagement portion configured to receive an engagement portion of a stand, a system comprising:
a first strap;
a coupler having a first portion and a second portion, the first portion of the coupler sized and shaped to engage with the engagement portion of camera, the second portion of the coupler sized and shaped to engage with the first strap;
an enclosure having an interior area with an aperture and an exterior; and
a shoulder strap with a first end portion and a second end portion attached to the exterior of the enclosure, the first end portion of the shoulder strap attached closer to the aperture and the second end of the shoulder strap attached farther from the aperture, the first strap having a first end portion attached to the enclosure inside the interior area.

51. The system of aspect 50, wherein the second portion of the coupler is configured to slideably engage with the first strap.

52. The system of aspect 51, wherein the first strap has a second end portion attached to the shoulder strap adjacent to the second end of the shoulder strap.

53. The system of aspect 50, wherein the enclosure further includes a covering to cover the aperture.

From the foregoing it will be appreciated that, although specific implementations of the invention have been described herein for purposes of illustration, various modifications can be made without deviating from the spirit and scope of the invention. Accordingly, the invention is not limited except as by the appended claims.

The invention claimed is:

1. For a camera having at least one engagement portion each configured to receive an engagement portion of a stand, a system for coupling with the engagement portion of the camera, the system comprising:
a first strap;
a coupler having a first portion and a second portion, the first portion of the coupler sized and shaped to engage with the engagement portion of the camera, the second portion of the coupler sized and shaped to engage with the first strap;
an enclosure having an interior area with an aperture and an exterior; and
a shoulder strap with a first end portion and a second end portion attached to the exterior of the enclosure, the first end portion of the shoulder strap attached closer to the aperture and the second end of the shoulder strap attached farther from the aperture, the first strap having a first end portion attached to the enclosure inside the interior area.

2. The system of claim 1, wherein the second portion of the coupler in configured to slideably engage with the first strap.

3. The system of claim 2, wherein the first strap has a second end portion attached to the shoulder strap adjacent to the second end of the shoulder strap.

4. The system of claim 3, wherein the enclosure further includes a covering to cover the aperture.

5. A system comprising:
a camera having an engagement portion configured to receive an engagement portion of a stand;
a first strap;
a coupler having a first portion and a second portion, the first portion of the coupler configured to engage with the engagement portion of the camera, the second portion of the coupler configured to engage with the first strap;
an enclosure having an interior area with an aperture and an exterior; and
a shoulder strap with a first end portion and a second end portion attached to the exterior of the enclosure, the first end portion of the shoulder strap attached closer to the aperture and the second end of the shoulder strap attached farther from the aperture, the first strap having a first end portion attached to the enclosure inside the interior area.

6. The system of claim 5, wherein the second portion of the coupler is configured to slideably engage with the first strap.

7. The system of claim 6, wherein the first strap has a second end portion attached to the shoulder strap adjacent to the second end of the shoulder strap.

8. The system of claim 5, wherein the enclosure further includes a covering to cover the aperture.

9. For a camera having one engagement portion configured to receive an engagement portion of a stand, a system comprising:
a first strap;
a coupler having a first portion and a second portion, the first portion of the coupler sized and shaped to engage with the engagement portion of the camera, the second portion of the coupler sized and shaped to engage with the first strap;
an enclosure having an interior area with an aperture and an exterior; and
a shoulder strap with a first end portion and a second end portion attached to the exterior of the enclosure, the first end portion of the shoulder strap attached closer to the aperture and the second end of the shoulder strap attached farther from the aperture, the first strap having a first end portion attached to the enclosure inside the interior area and a second end portion attached other than inside the interior area.

10. The system of claim 9, wherein the second portion of the coupler is configured to slideably engage with the first strap.

11. The system of claim 10, wherein the second end portion of the first strap is attached to the shoulder strap adjacent to the second end of the shoulder strap.

12. The system of claim 9, wherein the enclosure further includes a covering to cover the aperture.

* * * * *